(12) United States Patent
Wakao et al.

(10) Patent No.: US 9,016,568 B2
(45) Date of Patent: Apr. 28, 2015

(54) READER DEVICE, DATA PROCESSING APPARATUS MOUNTED WITH THE SAME AND GENUINE/COUNTERFEIT JUDGMENT METHOD

(71) Applicant: Panasonic Corporation, Osaka (JP)

(72) Inventors: Satoru Wakao, Kanagawa (JP); Junichi Sakaki, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/234,471

(22) PCT Filed: Feb. 22, 2013

(86) PCT No.: PCT/JP2013/001028
§ 371 (c)(1),
(2) Date: Jan. 23, 2014

(87) PCT Pub. No.: WO2013/125245
PCT Pub. Date: Aug. 29, 2013

(65) Prior Publication Data
US 2014/0138438 A1 May 22, 2014

(30) Foreign Application Priority Data
Feb. 22, 2012 (JP) ................. 2012-036000

(51) Int. Cl.
*G06K 5/00* (2006.01)
*G06K 19/073* (2006.01)
(Continued)

(52) U.S. Cl.
CPC ............. *G06K 5/00* (2013.01); *G06K 19/073* (2013.01); *G07D 7/00* (2013.01); *G07F 7/00* (2013.01); *G07D 7/0093* (2013.01); *G06F 21/00* (2013.01)

(58) Field of Classification Search
USPC ................. 235/380, 492, 487, 451, 375
See application file for complete search history.

(56) References Cited

U.S. PATENT DOCUMENTS 4,710,613 A   12/1987   Shigenaga
5,549,953 A   8/1996    Li
(Continued)

FOREIGN PATENT DOCUMENTS

JP   61-139873   6/1986
JP   07-200913   8/1995
(Continued)

OTHER PUBLICATIONS

International Search Report, mailed Apr. 2, 2013, in corresponding International Application No. PCT/JP2013/001028.

*Primary Examiner* — Edwyn Labaze
(74) *Attorney, Agent, or Firm* — Greenblum & Bernstein, P.L.C.

(57) ABSTRACT

A reader device performs control to cause rates of transmission at the time of transmitting an authentication command to an IC chip included in a passport to be different from each other. Then, when the rates of transmission are caused to be different from each other, each of required times T1 and T2 required after transmitting the authentication command to the IC chip until receiving a response to the authentication command from the IC chip is measured. An operation time Tc required for execution of the authentication command in the IC chip is calculated on the basis of the required times T1 and T2 measured as described above, and, further, genuine/counterfeit judgment of the IC chip (genuine/counterfeit judgment of the passport is performed on the basis of the calculated operation time Tc.

11 Claims, 10 Drawing Sheets

(51) Int. Cl.
*G07D 7/00* (2006.01)
*G07F 7/00* (2006.01)
*G06F 21/00* (2013.01)

(56) References Cited

U.S. PATENT DOCUMENTS

| | | | |
|---|---|---|---|
| 5,568,251 | A | 10/1996 | Davies et al. |
| 5,910,989 | A | 6/1999 | Naccache |
| 6,527,173 | B1 * | 3/2003 | Narusawa et al. ............ 235/380 |
| 7,337,957 | B2 * | 3/2008 | Ashizaki et al. ............ 235/382 |
| 2005/0138303 | A1 * | 6/2005 | Nagino et al. ................ 711/154 |
| 2006/0049259 | A1 * | 3/2006 | Kitada ........................ 235/451 |
| 2009/0302120 | A1 * | 12/2009 | Omura et al. ................ 235/492 |
| 2010/0327056 | A1 * | 12/2010 | Yoshikawa et al. ........... 235/380 |

FOREIGN PATENT DOCUMENTS

| | | |
|---|---|---|
| JP | 10-506727 | 6/1998 |
| JP | 2006-324762 | 11/2006 |
| JP | 2008-030206 | 2/2008 |

\* cited by examiner (a) BASE SPEED (106 kbps)

(b) DOUBLE SPEED (212 kbps)

(c) CALCULATION OF OPERATION TIME

COMMUNICATION TIME AT BASE SPEED = ( T1 − T2 ) x 2

OPERATION TIME = T1 − ( T1 − T2 ) x 2

(a) BEFORE UPDATE OF DATABASE

× : JUDGED TO BE COUNTERFEIT ONE BY ANOTHER JUDGMENT MEANS (b) AFTER UPDATE OF DATABASE (a)

(b)

(a)

(b)

READER DEVICE, DATA PROCESSING APPARATUS MOUNTED WITH THE SAME AND GENUINE/COUNTERFEIT JUDGMENT METHOD

TECHNICAL FIELD

The present invention relates to a reader device for reading information from a form or a card, and in particular to a technique for judging whether a form or card is a genuine or counterfeit one.

BACKGROUND ART

Conventionally, reader devices for reading information from a form (for example, a passport which includes an IC chip) or a card (for example, an IC card) have been used, and, as such a reader device, those provided with a function of judging whether a form or card is a genuine or counterfeit one have been proposed.

For example, a method is known in which genuine/counterfeit judgment of a passport is performed on the basis of image data obtained by radiating infrared rays or ultraviolet rays onto the front face of a passport (on the basis of whether or not a particular pattern stands out, whether or not there is something unnatural in an image, or the like) (see Patent Literature 1).

Especially, on an IC card, such a hologram mark that a particular pattern stands out is formed on the surface of the card so as to detect whether the card is counterfeited (see, for example, Patent Literature 2). A method for detecting the hologram mark is also known (see, for example, Patent Literature 3).

In conventional reader devices, however, the operation load of image processing is heavy because genuine/counterfeit judgment is performed on the basis of image data or a hologram mark, and much time may be required to perform genuine/counterfeit judgment of a form or a card. Furthermore, it becomes possible to duplicate such an image data or a hologram mark with the recent progress of image forming techniques, and detection of counterfeiting may not be certainly performed by the genuine/counterfeit judgment using such a superficial and physical image forming technique.

CITATION LIST

Patent Literature

[Patent Literature 1] Japanese Patent Laid-Open No. H07-200913
[Patent Literature 2] U.S. Pat. No. 5,549,953 Specification
[Patent Literature 3] U.S. Pat. No. 5,568,251 Specification

SUMMARY OF INVENTION

Technical Problem

The present invention has been made under the above background. The object of the present invention is to provide a reader device capable of performing genuine/counterfeit judgment of a form or a card in a short time and enhancing the accuracy of the judgment, which is not influenced by superficial and physical duplication.

Solution to Problem

An aspect of the present invention is a reader device reading information from a form or a card, wherein the form or the card includes an IC chip executing a command transmitted from the reader device; and the reader device is provided with: a command transmission section transmitting plural commands to the IC chip; a transmission control section performing control to cause rates of transmission for transmitting the plural commands to be different from each other; a required time measurement section measuring each of required times after transmitting each of the plural commands to the IC chip until receiving a response to the command from the IC chip for each of the plural commands when the rates of transmission are caused to be different from each other by the transmission control section; an operation time calculation section calculating an operation time required for execution of the command in the IC chip on the basis of several required times measured by the time measurement section; and a genuine/counterfeit judgment section judging whether the IC chip is a genuine or counterfeit one on the basis of the operation time calculated by the operation time calculation section.

Other aspects of the present invention exist as described below. Therefore, disclosure of the present invention is intended to provide aspects of a part of the present invention and is not intended to restrict the scope of the present invention described and claimed here.

DESCRIPTION OF EMBODIMENTS

Figure 1:
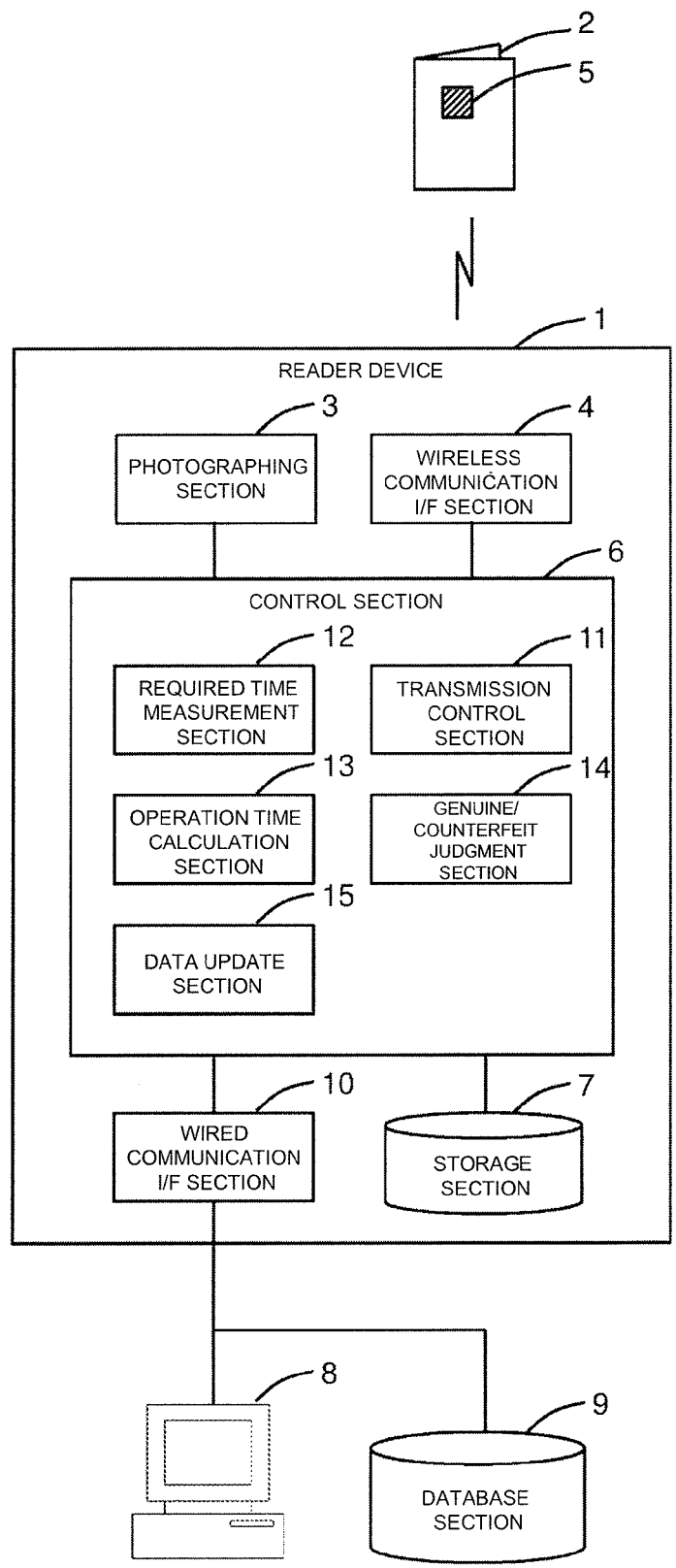
FIG. 1 is a block diagram of a reader device in a first embodiment of the present invention.

The present invention will be described in detail below. However, the detailed description below and accompanying drawings do not limit the invention.

A reader device of the present invention is a reader device reading information from an information storage medium such as a form and a card, wherein the information storage medium includes an IC chip executing a command transmitted from the reader device; and the reader device has a configuration including: a command communication section transmitting the command to the information storage medium and receiving a response signal from the information storage medium obtained as a result thereof; a storage section storing feature points of the IC chip, and a genuine/counterfeit judgment section extracting the feature points from the response signal from the information storage medium and judging whether the IC chip is a genuine or counterfeit one on the basis of the extracted feature points.

According to this configuration, genuine/counterfeit judgment of an IC chip is performed on the basis of extracted feature points. According to the present invention, it is possible to improve the judgment accuracy of the genuine/counterfeit judgment because of not being influenced by superficial and physical duplication.

The reader device of the present invention may further include: a communication control section causing the command communication section to transmit a first command and, after receiving a response signal from the information storage medium obtained as a result thereof, causing the command communication section to successively transmit a second command that is the same as the first command and that has a different communication specification; and a control section controlling the communication control section and the genuine/counterfeit judgment section.

According to this configuration, by causing communication specifications of the plural transmitting commands for the IC chip to be different from each other, feature points are extracted from plural response signals from the information storage medium.

The feature points are management information about the information storage medium and generation discrimination information for discriminating the generation of the IC chip of the information storage medium; and the storage section of the reader device of the present invention stores the generation discrimination information about the IC chip associated with the management information about the information storage medium; and the genuine/counterfeit judgment section of the reader device of the present invention may discriminate the generation of an IC chip that is supposed to be mounted on the information storage medium from the management information about the information storage medium and judges whether the generation discrimination information is about the IC chip of the generation that is supposed to be mounted.

According to this configuration, it is possible to, by causing communication specifications of the plural transmitting commands for the IC chip to be different from each other, judge whether or not generation information about the IC chip obtained from plural response signals from an information storage medium corresponds to generation information about the IC chip associated with management information, and, therefore, it is possible to judge whether the information storage medium mounted with the IC chip is a genuine or counterfeit one.

The generation discrimination information in the reader device of the present invention is an operation time required for the IC chip of the information storage medium to execute the command; the communication specification is a rate of transmission; the storage section stores operation time information about the IC chip associated with the management information about the information storage medium, for each generation; and the genuine/counterfeit judgment section may discriminate the generation of the IC chip that is supposed to be mounted on the information storage medium from the management information about the information storage medium and judge whether the operation time is included in operation time information about the IC chip of the generation that is supposed to be mounted.

According to this configuration, it is possible to, by causing rates of transmission of the plural transmitting commands for the IC chip to be different from each other, discriminate generation information about the IC chip based on the operation time of the IC chip obtained from plural response signals from an information storage medium. Then, since it is possible to judge whether generation information about the IC chip corresponds to generation information about the IC chip associated with management information, it is possible to judge the information storage medium mounted with the IC chip is a genuine or counterfeit one.

The control section of the reader device of the present invention may further include: a required time measurement section measuring each of a first required time required after transmitting the first command to the information storage medium until receiving a first response signal of the information storage medium to the first command and a second required time required after transmitting the second command to the information storage medium until receiving a second response signal of the information storage medium to the second command; and an operation time calculation section calculating an operation time required for execution of the first command and the second command in the IC chip of the information storage medium, on the basis of these first required time and second required time.

According to this configuration, rates of transmission (communication speeds) at the time of transmitting a command to an IC chip are caused to be different from each other, and a time required after transmitting the command until receiving a response to the command is measured. Then, an operation time required for execution of the command in the IC chip is calculated on the basis of the required times, and it is judged whether the IC chip is a genuine or counterfeit one on the basis of the operation time. According to the present invention, it is possible to perform genuine/counterfeit judgment of an IC chip (genuine/counterfeit judgment of a form or a card) with a smaller operation load and in a shorter time in comparison with image processing. Furthermore, the judgment accuracy of the genuine/counterfeit judgment can be improved because of not being influenced by superficial and physical duplication.

Both of the first command and the second command transmitted by the reader device of the present invention may be illegal authentication commands generated so that such a response signal is obtained that an access to information stored in the information storage medium is rejected by the information storage medium.

According to this configuration, a feature point (for example, an operation time) different from a feature point obtained when a legal authentication command is transmitted is obtained by transmitting an illegal authentication command. Especially when a difference between the feature points is remarkable in a counterfeit information storage medium mounted with an illegal (for example, old-generation) IC chip, the counterfeit information storage medium is found more easily.

The communication control section of the reader device of the present invention may control the command communication section to transmit a legal authentication command generated so that such a response signal is obtained that an access to information stored in the information storage medium is authenticated by the information storage medium, before transmitting the illegal authentication commands.

According to this configuration, the number of times that an information storage medium is collated never exceeds an upper limit, and it is possible to prevent a genuine information storage medium held by a legal holder from being disabled.

The communication control section of the reader device of the present invention may control the command communication section to, if the generation discrimination information is judged to be generation information about the IC chip of the generation that is supposed to be mounted, as a result of the judgment by the genuine/counterfeit judgment section, transmit a legal authentication command generated so that such a response signal is obtained that an access to information stored in the information storage medium is authenticated by the information storage medium.

According to this configuration, the number of times that an information storage medium is collated never exceeds an upper limit, and it is possible to prevent a genuine information storage medium held by a legal holder from being disabled.

The communication control section of the reader device of the present invention may control the command communication section to, if the generation discrimination information is judged not to be generation information about the IC chip of the generation that is supposed to be mounted, as a result of the judgment by the genuine/counterfeit judgment section, further transmit an illegal authentication command generated so that such a response signal is obtained that an access to information stored in the information storage medium is rejected by the information storage medium.

According to this configuration, an information storage medium is made unavailable and cannot be used any more. Even if a malicious third person attempts to use the information storage medium again with a conventional reader device after using the information storage medium with the reader device and running away because it is nearly found that the information storage medium is a counterfeit one, it is possible to prevent the malicious person from doing it. Then, it is possible to reduce spread of damage due to illegal use of the counterfeit information storage medium.

The reader device of the present invention may further include a data update section updating data of the feature points stored in the storage section.

According to this configuration, the storage section stores data about feature points for genuine/counterfeit judgment of an IC chip, and the data is updated on the basis of information obtained by other means such as genuine/counterfeit judgment of the IC chip by judgment means other than the genuine/counterfeit judgment (for example, genuine/counterfeit judgment using an image or magnetism). Thereby, the data (the data for genuine/counterfeit judgment of the IC chip) stored in a database section is appropriately updated, and the accuracy of genuine/counterfeit judgment of the IC chip by the genuine/counterfeit judgment section is improved.

A data processing apparatus of the present invention is provided with any of the reader devices described above, and, if an IC chip is judged to be legal by the genuine/counterfeit judgment section, the data processing apparatus executes subsequent data processing.

According to this configuration, genuine/counterfeit judgment of an IC chip is performed on the basis of extracted feature points. According to the present invention, it is possible to improve the judgment accuracy of the genuine/counterfeit judgment because of not being influenced by superficial and physical duplication. If judging the IC chip to be legal, the data processing apparatus of the present invention performs data processing such as for account settlement by credit or payment by electronic money by the information storage medium. If judging the IC chip not to be legal, the data processing apparatus of the present invention does not perform the data processing such as for account settlement by credit or payment by electronic money by the information storage medium, and it is possible to prevent a malicious third person from illegally using the IC card.

A method of the present invention is a genuine/counterfeit judgment method executed by a reader device reading information from an information storage medium, wherein the information storage medium includes an IC chip executing a command transmitted from the reader device; and the genuine/counterfeit judgment method includes: transmitting the command to the information storage medium; and extracting feature points of the IC chip from plural response signals from the information storage medium and judging whether the IC chip is a genuine or counterfeit one on the basis of the extracted feature points.

According to this method, it is judged whether an IC chip is a genuine or counterfeit one on the basis of extracted feature points. According to the present invention, it is possible to improve the judgment accuracy of the genuine/counterfeit judgment because of not being influenced by superficial and physical duplication.

Otherwise, the reader device of the present invention is a reader device reading information from a form or a card, wherein the form or the card includes an IC chip executing a command transmitted from the reader device; and the reader device is configured including: a command transmission section transmitting a command to the IC chip; a transmission control section controlling a rate of transmission at the time of transmitting the command; a required time measurement section measuring each of times required after transmitting the command to the IC chip until receiving a response to the command from the IC chip when the rates of transmission are caused to be different from each other by the transmission control section; an operation time calculation section calculating an operation time required for execution of the command in the IC chip on the basis of the required times measured by the time measurement section; and a genuine/counterfeit judgment section judging whether the IC chip is a genuine or counterfeit one on the basis of the operation time calculated by the operation time calculation section.

According to this configuration, rates of transmission (communication speeds) at the time of transmitting a command to an IC chip are caused to be different from each other, and a time required after transmitting the command until receiving a response to the command is measured. Then, an operation time required for execution of the command in the IC chip is calculated on the basis of the required times, and it is judged whether the IC chip is a genuine or counterfeit one on the basis of the operation time. According to the present invention, it is possible to perform genuine/counterfeit judgment of an IC chip (genuine/counterfeit judgment of a form or a card) with a smaller operation load and in a shorter time in comparison with image processing. Furthermore, the judgment accuracy of the genuine/counterfeit judgment can be improved because of not being influenced by superficial and physical duplication.

For example, a time T1 required after transmitting a command at a base speed (106 kbps) until receiving a response is measured first, and a required time T2 required after transmitting the command at a double speed (212 kbps) until receiving a response is measured next. In this case, "(T1−T2)×2" can be thought to be a communication time at the base speed, and an operation time required for execution of the command in the IC chip can be thought to be "T1−(T1−T2)×

2". If this operation time is beyond a range of a value to be calculated in the case of a genuine IC chip, the IC chip is judged to be a counterfeit one.

The reader device of the present invention may have a configuration of further including: an illegal authentication command transmission section transmitting illegal authentication commands to an IC chip, wherein the transmission control section performs control to cause rates of transmission of the plural illegal authentication commands for the IC chip to be different from each other; the time measurement section measures each of times required after transmitting the illegal authentication commands with different transmission rates each other by controlling of the transmission control section to the IC chip until receiving a response to the illegal authentication commands from the IC chip; the operation time calculation section calculates an operation time required for execution of the illegal authentication command in the IC chip on the basis of the required times measured by the time measurement section; and the genuine/counterfeit judgment section judges whether the IC chip is a genuine or counterfeit one on the basis of the operation time calculated by the operation time calculation section.

According to this configuration, the rates of transmission (communication speed) at the time of transmitting an illegal authentication command to an IC chip are caused to be different from each other, and each of times required after transmitting each of the illegal authentication commands until receiving corresponding one of responses to the illegal authentication command are measured. Then, an operation time required for execution of the illegal authentication command in the IC chip is calculated on the basis of the required times, and it is judged whether the IC chip is a genuine or counterfeit one on the basis of the operation time.

In general, in a genuine IC chip, there is not a major difference between an operation time for processing an illegal authentication command has been transmitted and an operation time for processing a legal authentication command has been transmitted. On the other hand, in a counterfeit IC chip, there is a major difference between an operation time for processing an illegal authentication command has been transmitted and an operation time for processing a legal authentication command has been transmitted because of a reason that the IC chip is not a special-purpose product (exclusive goods), or the like. Therefore, if there is a major difference between operation times, the IC chip can be judged to be a counterfeit one.

The reader device of the present invention may have a configuration further including: a database section storing data of an operation time for judging an IC chip to be a genuine one and an operation time for judging the IC chip to be a counterfeit one as data for a genuine/counterfeit judgment of the IC chip; and a data update section updating the data for genuine/counterfeit judgment of the IC chip stored in the database section on the basis of a result of genuine/counterfeit judgment of the IC chip by judgment means other than the genuine/counterfeit judgment section.

According to this configuration, the database section stores data for genuine/counterfeit judgment of an IC chip (data of an operation time calculated in the case of a genuine IC chip and an operation time calculated in the case of a counterfeit IC chip), and the data is updated on the basis of a result of genuine/counterfeit judgment of the IC chip by judgment means other than the genuine/counterfeit judgment section (for example, genuine/counterfeit judgment using an image or magnetism). Thereby, the data (the data for genuine/counterfeit judgment of the IC chip) stored in a database section is appropriately updated, and the accuracy of genuine/counterfeit judgment of an IC chip by the genuine/counterfeit judgment section is improved.

In the reader device of the present invention, the database section may have a configuration in which, for each (released) generation of an IC chip, the data of the operation time for judging the IC chip to be a genuine one and the operation time for judging the IC chip to be a counterfeit one is stored.

According to this configuration, it is possible to perform genuine/counterfeit judgment corresponding to the generation of the IC chip. For example, the operation time of an IC chip of the first generation (a first-generation IC chip) is longer than the operation time of an IC chip of the next generation (a second-generation IC chip). Therefore, when genuine/counterfeit judgment is performed on the basis of the operation time of an IC chip without consideration of plural generations on IC chips to be distributed, there is a possibility of occurrence of wrong judgment. In the present invention, it is possible to prevent occurrence of such wrong judgment by performing genuine/counterfeit judgment in consideration of the operation time on IC chip varying in response to the difference in generation.

A method of the present invention is a genuine/counterfeit judgment method executed by a reader device reading information from a form or a card, wherein the form or the card includes an IC chip executing a command transmitted from the reader device; and the genuine/counterfeit judgment method includes: transmitting the command to an IC chip; performing control to cause rates of transmission at the time of transmitting the command to be different from each other; measuring each of times required after transmitting the command to the IC chip until receiving a response to the command from the IC chip when the rates of transmission are caused to be different from each other; calculating an operation time required for execution of the command in the IC chip on the basis of the required times which have been measured; and judging whether the IC chip is a genuine or counterfeit one on the basis of the calculated operation time.

According to this method also, rates of transmission (communication speeds) at the time of transmitting a command to an IC chip are caused to be different from each other, and a time required after transmitting the command until receiving a response to the command is measured, similarly to the above description. Then, an operation time required for execution of the command in the IC chip is calculated on the basis of the required times, and it is judged whether the IC chip is a genuine or counterfeit one on the basis of the operation time. Therefore, it is possible to perform genuine/counterfeit judgment of an IC chip (genuine/counterfeit judgment of a form or a card) with a smaller operation load and in a shorter time in comparison with image processing. Furthermore, the judgment accuracy of the genuine/counterfeit judgment can be improved because of not being influenced by superficial and physical duplication.

The present invention makes it possible to calculate an operation time required for execution of a command in an IC chip included in a form or a card with a reader device and perform genuine/counterfeit judgment of the IC chip on the basis of the operation time and can provide the reader device having an advantage of capable of performing genuine/counterfeit judgment of a form or a card in a short time. Furthermore, it is possible to improve the judgment accuracy of the genuine/counterfeit judgment because of not being influenced by superficial and physical duplication.

Reader devices of embodiments of the present invention will be described below with the use of drawings.

(First Embodiment)

In a first embodiment, a case of a reader device which reads information from a form (for example, a passport which includes an IC chip) will be described as an example. This reader device is provided with a function of discriminating a counterfeit passport.

A configuration of a reader device of the first embodiment of the present invention will be described with reference to drawings. FIG. 1 is a block diagram showing the reader device of the first embodiment. As shown in FIG. 1, the reader device 1 is provided with a photographing section 3 which photographs an image of a passport 2, and a wireless communication interface section 4 (a wireless communication IF section 4) which performs wireless communication with the passport 2. The wireless communication IF section 4 transmits, for example, plural authentication commands to the passport 2. The passport 2 includes an IC chip 5 which executes the authentication commands transmitted from the reader device 1.

The reader device 1 is also provided with a control section 6 which performs control for genuine/counterfeit judgment of the passport 2, a storage section 7 in which data for genuine/counterfeit judgment of the passport 2 is stored, a wired communication interface section 10 (a wired communication IF section 10) which performs wired communication with a computer apparatus 8, which is a terminal for display (or a terminal for control) or a database section 9.

The control section 6 is provided with a transmission control section 11, a required time measurement section 12, an operation time calculation section 13 and a genuine/counterfeit judgment section 14. The transmission control section 11 performs control to cause rates of transmission for transmitting the plural authentication commands to be different from each other. The required time measurement section 12 measures each of times required after transmitting each of the plural authentication commands to the IC chip 5 until receiving a response to the authentication command from the IC chip 5 for each of the plural authentication commands when the rates of transmission are caused to be different from each other by the transmission control section 11. The operation time calculation section 13 calculates an operation time required for execution of the authentication command in the IC chip 5 on the basis of several required times measured by the time measurement section. The genuine/counterfeit judgment section 14 judges whether the IC chip 5 is a genuine or counterfeit one on the basis of the operation time calculated by the operation time calculation section 13.

The wireless communication IF section 4 transmits plural illegal authentication commands (plural illegal authentication commands for genuine/counterfeit judgment) to the passport 2. The IC chip 5 of the passport 2 can execute the illegal authentication commands. In that case, the transmission control section 11 performs control to cause rates of transmission for transmitting the plural illegal authentication commands to be different from each other. The required time measurement section 12 measures each of times required after transmitting each of the plural illegal authentication commands to the IC chip 5 until receiving a response to the illegal authentication command from the IC chip 5 for each of the plural illegal authentication commands when the rates of transmission are caused to be different from each other by the transmission control section 11. The operation time calculation section 13 calculates an operation time required for execution of the illegal authentication command in the IC chip 5 on the basis of several required times measured by the time measurement section. The genuine/illegal authentication judgment section 14 can also judge genuine/illegal authentication of the IC chip 5 on the basis of the operation time calculated by the operation time calculation section 13 when the illegal authentication command is used.

Figure 2:
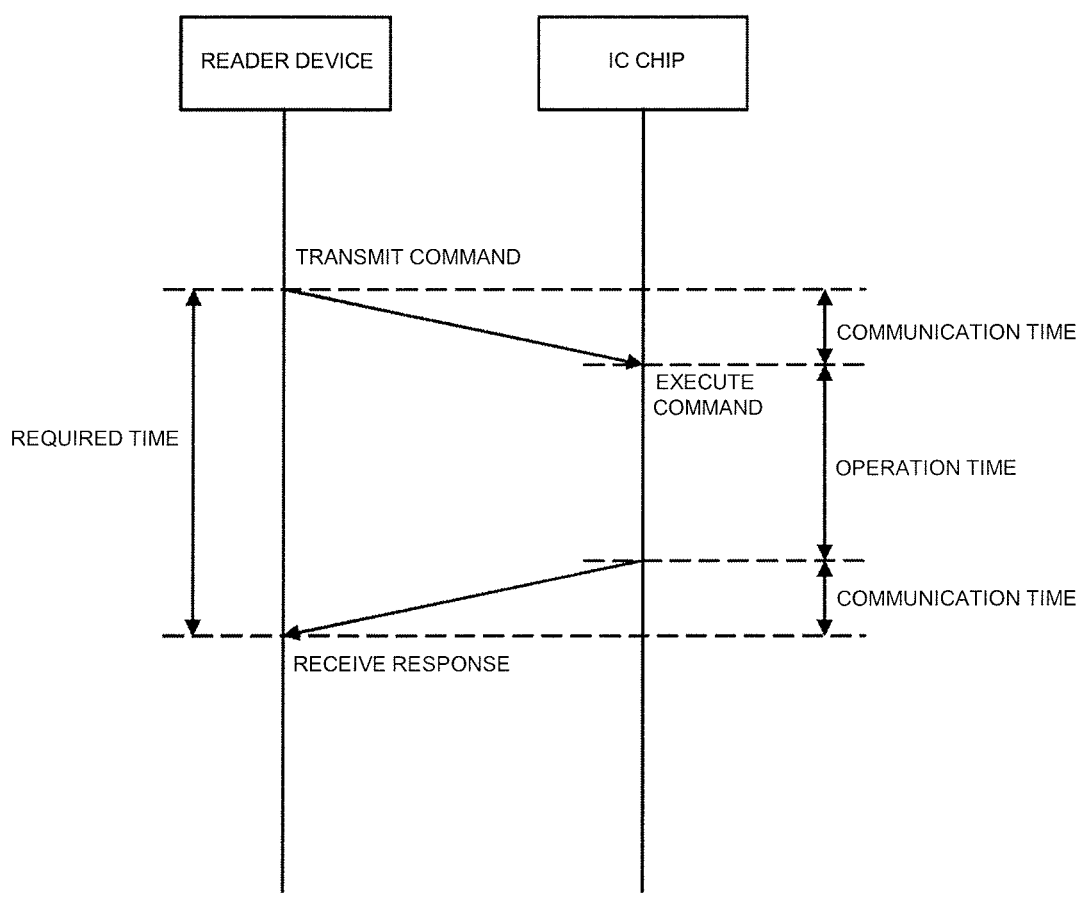
FIG. 2 is a diagram for illustrating a time required after transmitting a command until receiving a response in the first embodiment of the present invention.

Here, measurement of the required times and calculation of the operation time will be described with reference to drawings. FIG. 2 is a diagram illustrating a time required after the reader device 1 transmitting an authentication command (or an illegal authentication command) to the IC chip 5 until receiving a response. As shown in FIG. 2, the "required time" is the sum total of a "communication time" at the time of the reader device 1 transmitting an authentication command to the IC chip 5, an "operation time" required for execution of the authentication command in the IC chip 5, and a "communication time" at the time of the reader device 1 receiving a response from the IC chip 5.

Figure 3:
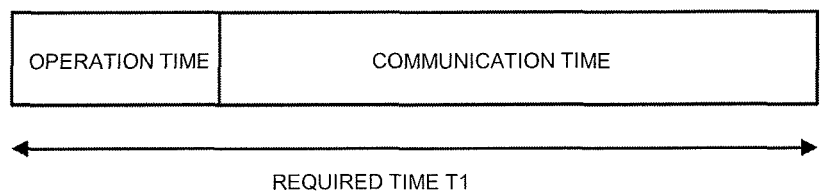
FIGS. 3(*a*)-(*c*) are diagrams illustrating how to calculate an operation time from the required times in the first embodiment of the present invention.
Figure 3:
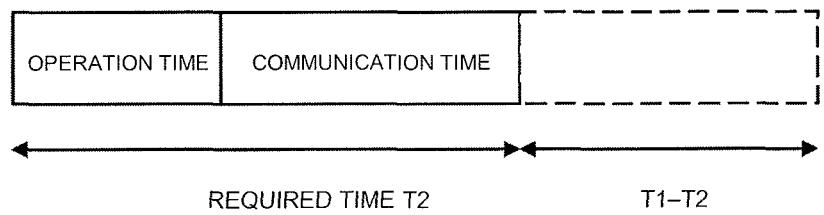

FIG. 3 is a diagram illustrating how to calculate an operation time from required times. As shown in FIG. 3(a), a required time T1 required when an authentication command has been transmitted at a base speed (for example, 106 kbps) is the sum total of an "operation time" required for execution of the authentication command in the IC chip 5 and "communication times" required at the time of transmitting the authentication command and at the time of receiving a response. As shown in FIG. 3(b), a required time T2 required when the authentication command has been transmitted at a double speed (for example, 212 kbps) is the sum total of an "operation time" required for execution of the authentication command in the IC chip 5 and "communication times" required at the time of transmitting the authentication command and at the time of receiving a response. In general, in the case of the same command, a "communication time" at a double speed is half a "communication time" at a base speed. Therefore, as shown in FIG. 3(c), the "communication time" at the base speed can be calculated as "(T1−T2)×2", and the "operation time" can be calculated as "T1−(T1−T2)×2".

Returning to FIG. 1, the description of the configuration of the reader device 1 will be continued. The database section 9 stores data of an operation time for judging the IC chip 5 to be a genuine one and an operation time for judging the IC chip 5 to be a counterfeit one as data for genuine/counterfeit judgment of the IC chip 5. As shown in FIG. 1, the control section 6 is provided with a data update section 15 updating the data for genuine/counterfeit judgment of the IC chip 5 stored in the database section 9 on the basis of a result of genuine/counterfeit judgment of the IC chip 5 by judgment means other than the genuine/counterfeit judgment section 14.

Figure 4:
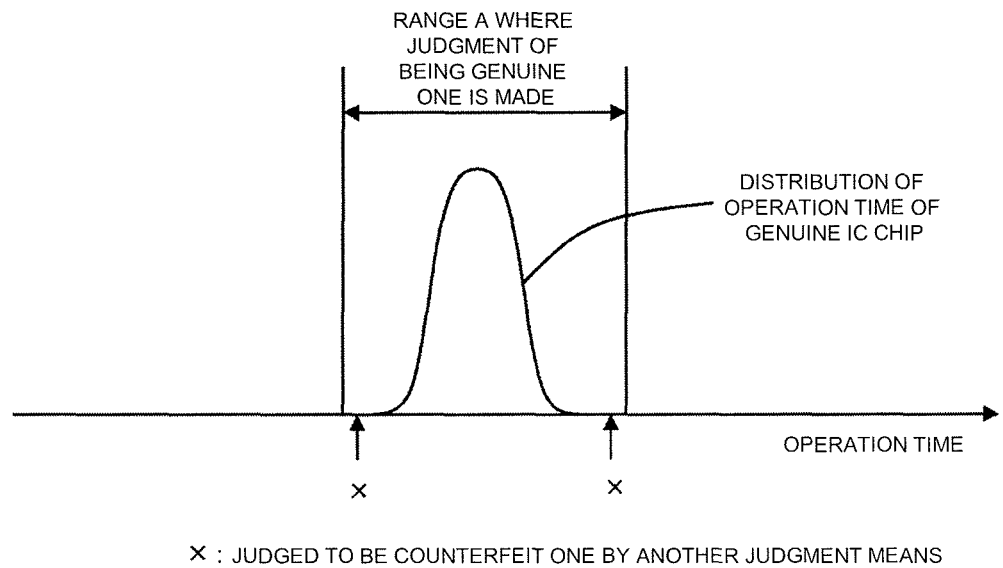
FIGS. 4(*a*) and (*b*) are block diagrams for illustrating update of data for genuine/counterfeit judgment in the first embodiment of the present invention.
Figure 4:
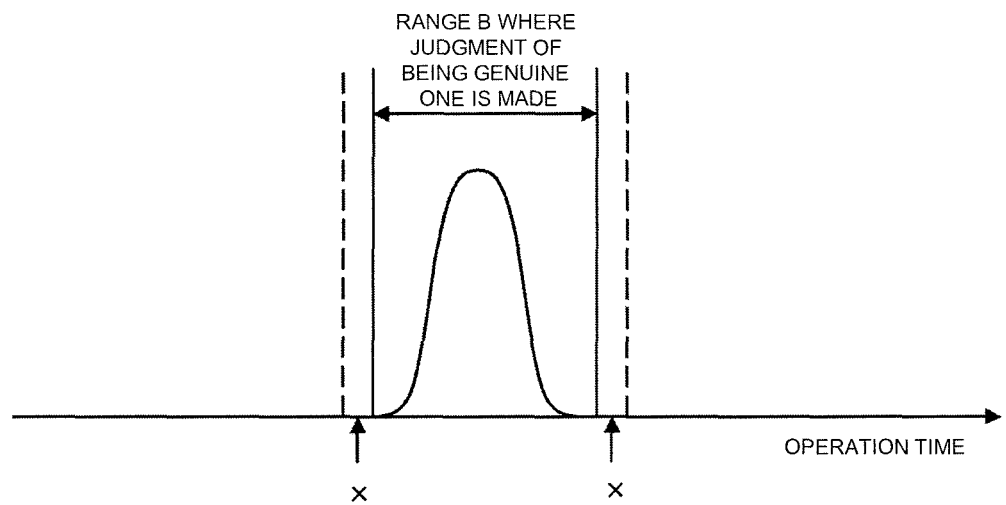

FIG. 4 is a diagram illustrating update of the data for genuine/counterfeit judgment. As shown in FIG. 4(a), before the database is updated (for example, at the time of shipment), the IC chip 5 is judged to be a "genuine" one if an operation time calculated by the operation time calculation section 13 is included within a predetermined range A (for example, such a rather wide range that distribution of the operation time of a genuine IC chip 5 is included). However, there may be a case where the passport 2 which is judged to be a "genuine" one by genuine/counterfeit judgment based on the operation time is judged to be a "counterfeit" one by other judgment means (for example, judgment means based on an image or magnetism) (indicated by × marks in FIG. 4). In such a case, the data for genuine/counterfeit judgment is updated so that a range where judgment of being a "genuine" one is made by the genuine/counterfeit judgment based on the operation time is updated to a range B narrower than an original range A (for example, a range after excluding the part where the IC chip 5 is judged to be a "counterfeit" one by the other judgment means), as shown in FIG. 4(b).

Figure 5:
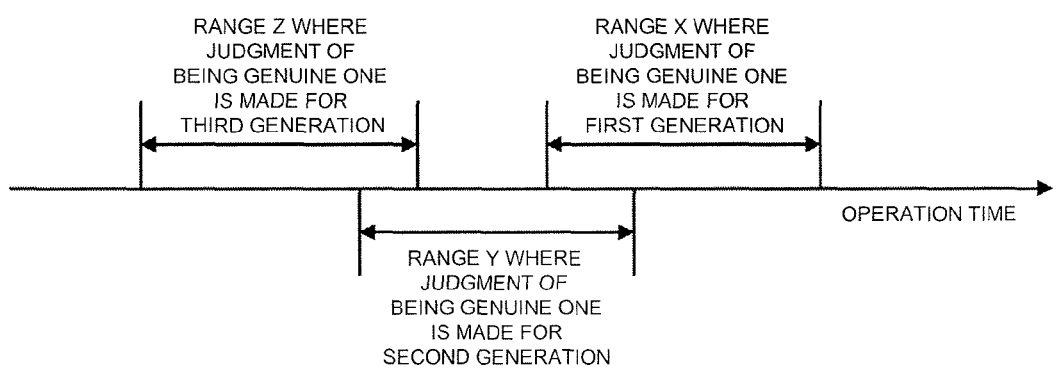
FIG. 5 is a diagram for illustrating an operation time for each generation of an IC chip in the first embodiment of the present invention.

The database section 9 stores data of an operation time calculated in the case of a genuine IC chip 5 and an operation time calculated in the case of a counterfeit IC chip 5 for each generation of the IC chip 5. For example, FIG. 5 is a diagram showing an example of an operation time for each generation of the IC chip 5. As shown in FIG. 5, in the case of a first-generation IC chip 5, the IC chip 5 is judged to be a "genuine" one if an operation time calculated by the operation time calculation section 13 is included within a predetermined range X. In the case of a second-generation IC chip 5, the IC chip 5 is judged to be a "genuine" one if an operation time calculated by the operation time calculation section 13 is included within a predetermined range Y. In the case of a third-generation IC chip 5, the IC chip 5 is judged to be a "genuine" one if an operation time calculated by the operation time calculation section 13 is included within a predetermined range Z.

An operation of the reader device 1 configured as described above will be described with reference to drawings.

Figure 6:
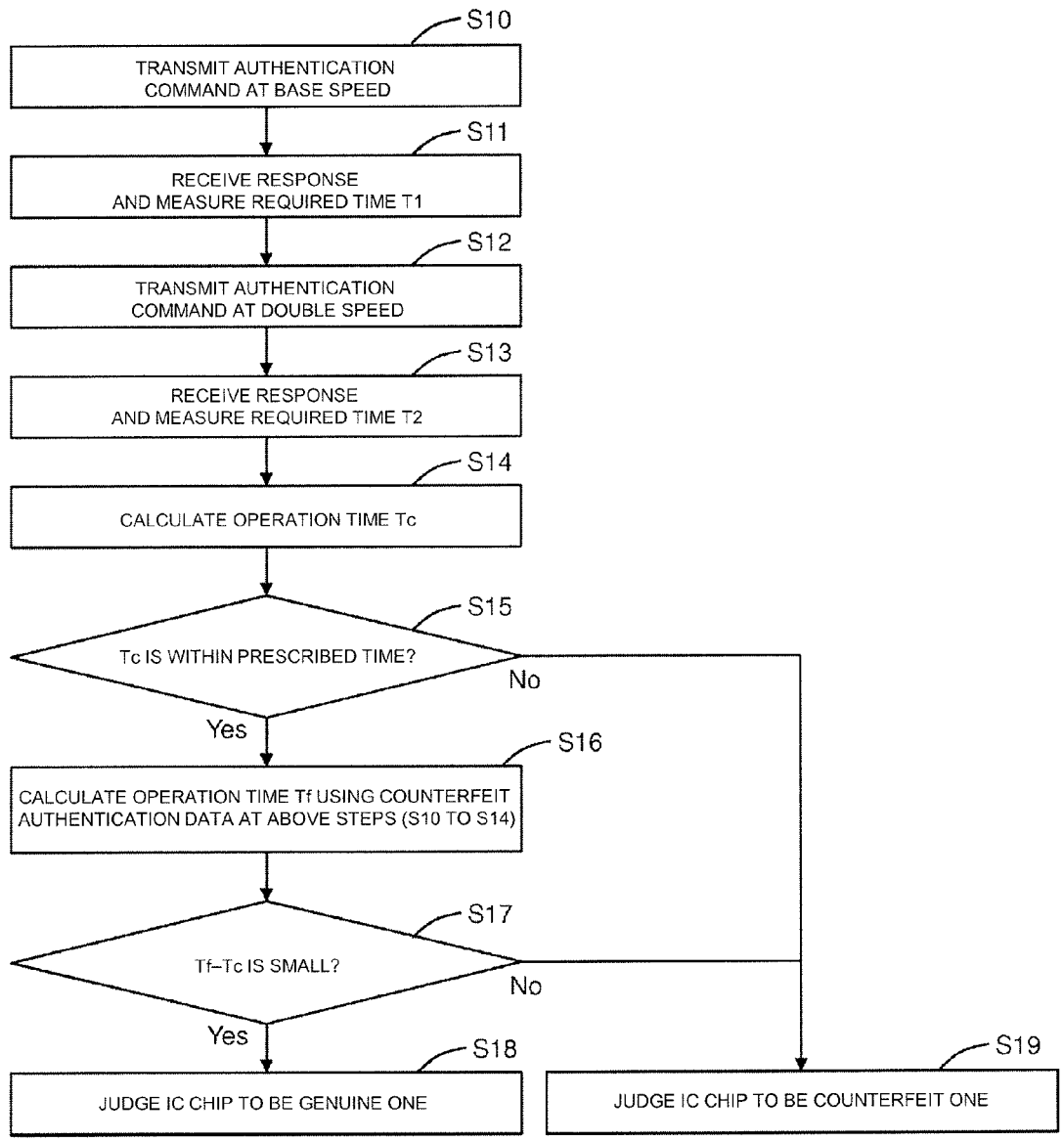
FIG. 6 is a flowchart for illustrating an operation of the reader device in the first embodiment of the present invention.

FIG. 6 is a flowchart illustrating a flow of an operation when rates of transmission at the time of transmitting an authentication command are caused to be different from each other to perform genuine/counterfeit judgment of the IC chip 5 (genuine/counterfeit judgment of the passport 2). As shown in FIG. 6, the reader device 1 measures the required time T1 required after transmitting a (legal) authentication command to the IC chip 5 at the base speed (S10) until receiving a response from the IC chip 5 (S11) first. Next, the reader device 1 measures the required time T2 required after transmitting the (legal) authentication command to the IC chip 5 at the double speed (S12) until receiving a response from the IC chip 5 (S13).

The reader device 1 calculates an operation time Tc required for execution of the authentication command in the IC chip 5 from the required times T1 and T2 measured as described above (S14). Then, if the operation time Tc calculated as described above is not within a predetermined range specified for the generation corresponding to the IC chip 5 (S15), it is judged that the IC chip 5 is a "counterfeit" one, that is, the passport 2 is a "counterfeit" one (S19).

On the other hand, if the operation time Tc is within the predetermined range specified for the generation corresponding to the IC chip 5 (S15), the above steps S10 to S14 are executed with the use of illegal authentication data to calculate an operation time Tf (S16). Then, if a difference between the operation times "Tf−Tc" is small (S17), it is judged that the IC chip 5 is a "genuine" one, that is, the passport 2 is a "genuine" one (S18). On the other hand, if the difference between the operation times "Tf−Tc" is large (S17), it is judged that the IC chip 5 is a "counterfeit" one, that is, the passport 2 is a "counterfeit" one (S19).

Though an example of transmitting an authentication command with the rate of transmission called "a base speed" and the authentication command with the different rate of transmission called "a double speed" has been described here, it may be also available of transmitting the authentication command with the rate of transmission called "a quad-speed" and the authentication command with the rate of transmission called "an 8× speed".

According to the reader device 1 of the first embodiment as described above, it is possible to calculate an operation time required for execution of an authentication command in the IC chip 5 of the passport 2 with the reader device 1 to judge whether the IC chip 5 is a genuine or counterfeit one on the basis of the operation time, and, therefore, it is possible to perform genuine/counterfeit judgment of the passport 2 in a short time.

That is, in the first embodiment, the rates of transmission (communication speeds) at the time of transmitting an authentication command to the IC chip 5 are caused to be different from each other, and the required times T1 and T2 required after transmitting each of the plural authentication commands until receiving a response to the authentication command are measured. Then, the operation time Tc required for execution of the authentication command in the IC chip 5 is calculated on the basis of the required times T1 and T2, and it is judged whether the IC chip 5 is a genuine or counterfeit one on the basis of this operation time Tc. According to the reader device 1 of the first embodiment, it is possible to perform genuine/counterfeit judgment of the IC chip 5 (genuine/counterfeit judgment of the passport 2) with a smaller operation load and in a shorter time in comparison with image processing.

For example, the required time T1 required when the authentication command has been transmitted at the base speed (106 kbps) is measured first, and the required time T2 required when the authentication command has been transmitted at the double speed (212 kbps) is measured next. In this case, "(T1−T2)×2" can be thought to be a communication time at the base speed, and the operation time Tc required for execution of the authentication command in the IC chip 5 can be thought to be "T1−(T1−T2)×2". If this operation time Tc is beyond a range of a value to be calculated in the case of a genuine IC chip 5, the IC chip 5 is judged to be a counterfeit one.

In the first embodiment, the rates of transmission (communication speeds) at the time of transmitting an illegal authentication command to the IC chip 5 are caused to be different from each other, and each of required times T1 and T2 required after transmitting each of the illegal authentication commands until receiving corresponding one of responses to the illegal authentication command are measured. Then, the operation time Tf required for execution of the illegal authentication command in the IC chip 5 is calculated on the basis of the required times T1 and T2, and it is judged whether the IC chip 5 is a genuine or counterfeit one on the basis of this operation time Tf and the above operation time Tc.

In general, in a genuine IC chip 5, there is not a major difference between an operation time for processing an illegal authentication command has been transmitted and an operation time for processing a legal authentication command has been transmitted. On the other hand, in a counterfeit IC chip 5, there is a major difference between an operation time for processing an illegal authentication command has been transmitted and an operation time for processing a legal authentication command has been transmitted because of a reason that the IC chip 5 is not a special-purpose product (exclusive goods), or the like. Therefore, if there is a major difference between operation times, the IC chip 5 can be judged to be a counterfeit one.

In the first embodiment, data for genuine/counterfeit judgment of the IC chip 5 (data of an operation time for judging the IC chip 5 to be a genuine one and of an operation time for judging the IC chip 5 to be a counterfeit one) is stored in the database section 9, and the data is updated on the basis of a result of genuine/counterfeit judgment of the IC chip 5 by judgment means other than the genuine/counterfeit judgment section 14 (for example, genuine/counterfeit judgment using an image or magnetism). Thereby, the data (the data for genuine/counterfeit judgment of the IC chip 5) stored in the database section 9 is appropriately updated, and the accuracy of genuine/counterfeit judgment of the IC chip 5 by the genuine/counterfeit judgment section 14 is improved.

In the first embodiment, it is possible to perform genuine/counterfeit judgment corresponding to the generation of the IC chip 5. For example, the operation time of an IC chip 5 of the first generation (a first-generation IC chip 5) is longer than the operation time of an IC chip 5 of the next generation (a second-generation IC chip 5). Therefore, when genuine/counterfeit judgment is performed on the basis of the operation time of an IC chip 5 without consideration of plural generations on IC chips 5 to be distributed, there is a possibility of occurrence of wrong judgment. In the reader device 1 of the first embodiment, it is possible to prevent occurrence of such wrong judgment by performing genuine/counterfeit judgment in consideration of the operation time on IC chip 5 varying in response to the difference in generation.

The first embodiment of the present invention has been described as an example. However, the scope of the present invention is not limited thereto but can be changed or modified according to purposes within the scope described in the claims.

For example, the case of the reader device 1 which reads information from a form which includes the IC chip 5 has been described in the above description. However, the scope of the present invention is not limited thereto, and a reader device 1 which reads information from a card which includes the IC chip 5 is also possible.

(Second Embodiment)

In a second embodiment, a case of a reader device which reads information from an IC card, for example, a credit card which includes an IC chip will be described as an example. The reader device in the second embodiment is provided with a function of discriminating a counterfeit IC card.

Figure 7:
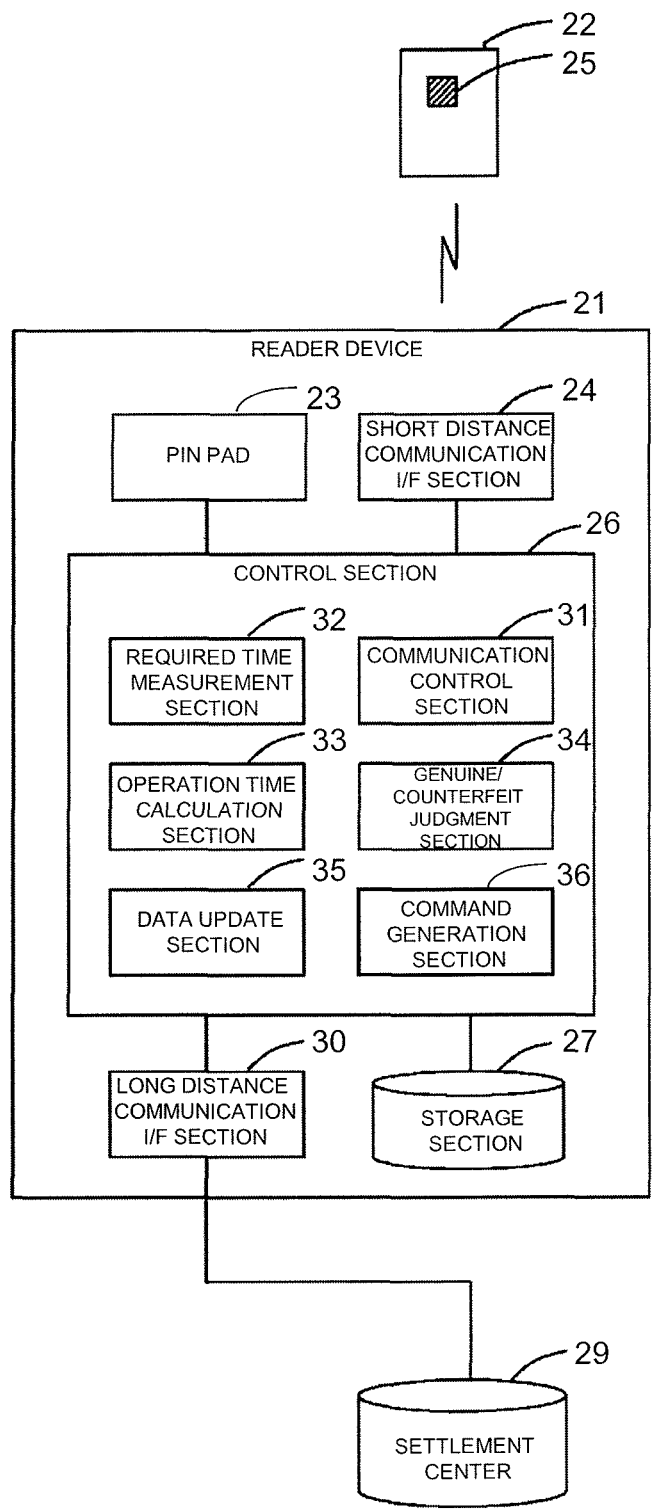
FIG. 7 is a block diagram showing a reader device of a second embodiment.

A configuration of a reader device of the second embodiment of the present invention will be described with reference to drawings. FIG. 7 is a block diagram showing the reader device of the second embodiment. As shown in FIG. 7, the photographing section 3 which photographs an image of the passport 2 and a PIN pad 23 are for inputting a password to perform card holder authentication for confirming whether the user of an IC card 22 is a legal holder or not. A reader device 21 contactlessly performs short distance communication with the IC card 22 via a short distance communication interface section 24 (short distance communication IF section 24). The reader device 21 performs communication with a settlement center 29 at a long distance via a wired long distance communication interface section 30 (long distance communication IF section 30). However, this communication with the settlement center 29 may be performed via wireless communication. A control section 26 of the reader device 21 controls these PIN pad 23, short distance communication IF section 24 and long distance communication IF section 30. Data for genuine/counterfeit judgment of the IC card 22 is stored in a storage section 27.

The wireless communication IF section 24 transmits, for example, a card holder authentication command (hereinafter referred to as a "CH authentication command") to the IC card 22. The IC card 22 includes an IC chip 25 which executes the CH authentication command transmitted from the reader device 21. The IC chip 25 has a CPU as well as a ROM storing an execution program and a cryptographic algorithm, a RAM which is a memory for data processing, an EEPROM which is a memory for storing data, a co-processor for processing a public key cryptographic algorithm at a high speed and the like. A communication antenna not shown which is for performing communication with the reader device to be described later is connected to this IC chip 25. The IC card 22 also has a magnetic stripe (not shown) in which a card number and the like are recorded, though it is not shown. The card number is recorded not only in this magnetic stripe but also stored in the IC chip 25.

When a password is inputted to the PIN pad 23, the control section 26 of the reader device 21 embeds, for example, data obtained by processing the password with a one-way function, such as a hash function, or a cryptographic function into a CH authentication command in a command generation section 36. The CH authentication command is sent to the IC card 22 from the reader device 21 via the wireless communication IF section 24. The IC card 22 interprets the CH authentication command. Next, the inputted data (the data obtained by processing the password with a one-way function, such as a hash function, or a cryptographic function) and data obtained by performing processing similar to the above for a reference password stored in the IC card 22 are collated with each other. Then, a result of the collation is transmitted to the reader device 21 via the wireless communication IF section 24. The reference password is stored in the memory of the IC card 22 in a manner that it can be never read out. Only the collation result is notified to the reader device 21 from the IC card 22.

A difference between the reader device 1 (see FIG. 1) in the first embodiment described before and the reader device 21 (see FIG. 7) in the second embodiment is as follows. That is, those corresponding to the photographing section 3 which photographs an image of the passport 2 and the computer apparatus 8 which is a terminal for display in FIG. 1 showing the first embodiment do not exist in FIG. 7 showing the second embodiment. Instead, the reader device 21 of the second embodiment is provided with the PIN pad 23 which does not exist in the reader device 1 of the first embodiment. It is the passport 2 that the reader device 1 shown in FIG. 1 reads via the wireless communication IF section 4, while it is the IC card 22 that the reader device 21 shown in FIG. 7 reads via the wireless communication IF section 24. Furthermore, the settlement center 29 in the second embodiment is physically far away from the reader device 21 and connected to the reader device 21 via the Internet or a telephone line. In the second embodiment, connection between the reader device 21 and the settlement center 29 is assumed to be wired communication. However, if the reader device 21 is a mobile terminal, wireless communication is also possible. Though there are other small differences, the control section 6 (see FIG. 1) in the first embodiment and the control section 26 (see FIG. 7) in the second embodiment have similar functions and basic configurations.

In FIG. 7, the control section 26 in the second embodiment is provided with a communication control section 31, a required time measurement section 32, an operation time calculation section 33 and a genuine/counterfeit judgment section 34. The communication control section 31 performs control to cause rates of transmission at the time of transmitting a CH authentication command to be different from each other. The required time measurement section 32 measures each of times required after transmitting the CH authentication command to the IC chip 25 until receiving a response to the CH authentication command from the IC chip 25 when the rates of transmission are caused to be different from each other by the communication control section 31. The operation time calculation section 33 calculates an operation time required for execution of the CH authentication command in the IC chip 25 on the basis of the required times measured by the time measurement section. The genuine/counterfeit judgment section 34 judges whether the IC chip 25 is a genuine or counterfeit one on the basis of the operation time calculated by the operation time calculation section 33.

The wireless communication IF section 24 transmits an illegal CH authentication command (an illegal CH authentication command for genuine/counterfeit judgment) to the IC card 22. This illegal CH authentication command is a command specially generated so as to make it easy to detect a card to be a counterfeit one. The details thereof will be described later. The IC chip 25 of the IC card 22 can execute this illegal CH authentication command. In that case, the communication control section 31 performs control to cause rates of transmission at the time of transmitting the illegal CH authentication command to be different from each other. The required time measurement section 32 measures each of times required after transmitting the illegal CH authentication command to the IC chip 25 until receiving response to the illegal CH authentication command from the IC chip 25 when the rates of transmission are caused to be different from each other by the communication control section 31. The operation time calculation section 33 calculates an operation time required for execution of the illegal CH authentication command in the IC chip 25 on the basis of the required times measured by the time measurement section. The genuine/illegal authentication judgment section 34 can also judge genuine/illegal authentication of the IC chip 25 on the basis of the operation time calculated by the operation time calculation section 33 when the illegal CH authentication command is used.

As described before, the control section 6 (see FIG. 1) in the first embodiment and the control section 26 (see FIG. 7) in the second embodiment have similar functions and basic configurations. Therefore, measurement of required times and calculation of an operation time are similar to those described in the first embodiment described before with the use of FIG. 2 (the diagram illustrating a time required after the reader device 1 transmitting an authentication command (or an illegal authentication command) to the IC chip 5 until the reader device 1 receiving a response thereto). That is, as shown in FIG. 3(a), a required time T1 required when a CH authentication command has been transmitted at a base speed (for example, 106 kbps) is the sum total of an "operation time" required for execution of the CH authentication command in the IC chip 25 and "communication times" at the time of transmitting the CH authentication command and at the time of receiving a response. As shown in FIG. 3(b), a required time T2 required when the CH authentication command has been transmitted at a double speed (for example, 212 kbps) is the sum total of an "operation time" required for execution of the CH authentication command in the IC chip 25 and "communication times" at the time of transmitting the CH authentication command and at the time of receiving a response. In general, in the case of the same command, a "communication time" at a double speed is half a "communication time" at a base speed. Therefore, as shown in FIG. 3(c), the "communication time" at the base speed can be calculated as "(T1−T2)×2", and the "operation time" can be calculated as "T1−(T1−T2)×2".

Returning to FIG. 7, the description of the configuration of the reader device 21 will be continued. The storage section 27 stores data of an operation time for judging the IC chip 25 to be a genuine one and an operation time for judging the IC chip 25 to be a counterfeit one as data for genuine/counterfeit judgment of the IC chip 25, and the data is updated on the basis of a result of genuine/counterfeit judgment of the IC chip 25 by judgment means other than the genuine/counterfeit judgment section 34 (for example, genuine/counterfeit judgment using an image which includes a hologram mark or a magnetic stripe). Therefore, the control section 26 is provided with a data update section 35 which updates the data for genuine/counterfeit judgment of the IC chip 25 stored in the storage section 27. The reader device 21 acquires the updated data from the settlement center 29. As described before, the settlement center 29 in the second embodiment is physically far away from the reader device 21 and connected to the reader device 21 via the Internet or a telephone line. In the second embodiment, communication between the reader device 21 and the settlement center 29 is assumed to be wired communication. However, if the reader device 21 is a mobile terminal, wireless communication is also possible. Thereby, the data (the data for genuine/counterfeit judgment of the IC chip 25) stored in the storage section 27 is appropriately updated, and the accuracy of genuine/counterfeit judgment of the IC chip 25 by the genuine/counterfeit judgment section 34 is improved.

As for update of the data for genuine/counterfeit judgment by the data update section 35 also, the update does not differ from that of the data update section 15 in the first embodiment (see FIG. 1) so much and is similar to that described before with the use of FIG. 4. That is, as shown in FIG. 4(a), before the database is updated (for example, at the time of shipment), if the operation time calculated by the operation time calculation section 33 is included within a predetermined range A (for example, such a rather wide range that distribution of the operation time of a genuine IC chip 25 is included), the IC chip 25 is judged to be a "genuine" one. However, there may be a case where the IC card 22 which is judged to be a "genuine" one by genuine/counterfeit judgment based on an operation time is judged to be a "counterfeit" one by other judgment means (for example, judgment means based on an image which includes a hologram mark or a magnetic stripe) (indicated by × marks in FIG. 4). In such a case, the data for genuine/counterfeit judgment is updated so that a range where judgment of being a "genuine" one is made by the genuine/counterfeit judgment based on the operation time is updated to a range B narrower than an original range A (for example, a range after excluding the part where the IC chip 25 is judged to be a "counterfeit" one by the other judgment means), as shown in FIG. 4(b).

As for the point of judging whether the IC chip 25 is a genuine or counterfeit one, using a different operation time for each generation of the IC chip 25, the point is similar to the description made with the use of FIG. 5 in the first embodiment described before (a diagram showing an example of an operation time for each generation of the IC chip). That is, the storage section 27 stores data of an operation time calculated in the case of a genuine IC chip 5 and an operation time calculated in the case of a counterfeit IC chip 25 for each generation of the IC chip 25. In the case of a first-generation IC chip 25, the IC chip 25 is judged to be a "genuine" one if an operation time calculated by the operation time calculation section 33 is included within a predetermined range X. In the case of a second-generation IC chip 25, the IC chip 25 is judged to be a "genuine" one if an operation time calculated by the operation time calculation section 33 is included within a predetermined range Y. In the case of a third-generation IC chip 25, the IC chip 25 is judged to be a "genuine" one if an operation time calculated by the operation time calculation section 33 is included within a predetermined range Z. The generation of the IC chip 25 which should be mounted on an IC card 22 for which genuine/counterfeit judgment is to be performed can be known, for example, from a magnetic stripe (not shown) or a card number recorded in the IC chip 25. As for the information, a reference table may be registered with the storage section 27, or an inquiry may be made to the settlement center 29.

As for the operation of the reader device 21 configured as described above, the operation is similar to that described with the use of FIG. 6 (a flowchart illustrating a flow of the operation at the time of performing genuine/counterfeit judgment of an IC chip) in the first embodiment described before. That is, the reader device 21 measures a required time T1 required after transmitting a (legal) CH authentication command to the IC chip 25 at the base speed (S10) until receiving a response from the IC chip 25 (S11) first. Next, the reader device 21 measures a required time T2 required after transmitting the (legal) CH authentication command to the IC chip 25 at the double speed (S12) until receiving a response from the IC chip 25 (S13).

The reader device 21 calculates an operation time Tc required for execution of the CH authentication command in the IC chip 25 from the required times T1 and T2 measured as described above (S14). Then, if the operation time Tc calculated as described above is not within a predetermined range specified for the generation corresponding to the IC chip 25 (S15), it is judged that the IC chip 25 is a "counterfeit" one, that is, the IC card 22 is a "counterfeit" one (S19).

On the other hand, if the operation time Tc is within the predetermined range specified for the generation corresponding to the IC chip 25 (S15), the above steps S10 to S14 are executed with the use of an illegal CH authentication command to calculate an operation time Tf (S16). Then, if a difference between the operation times "Tf−Tc" is small (S17), it is judged that the IC chip 25 is a "genuine" one, that is, the IC card 22 is a "genuine" one (S18). On the other hand, if the difference between the operation times "Tf−Tc" is large (S17), it is judged that the IC chip 25 is a "counterfeit" one, that is, the IC card 22 is a "counterfeit" one (S19).

Though an example of transmitting a CH authentication command with the rate of transmission called "a base speed" and the CH authentication command with the different rate of transmission called "a double speed" has been described here, it may be also available of transmitting the CH authentication command with the rate of transmission called "a quad-speed" and the CH authentication command with the rate of transmission called "an 8× speed".

According to the reader device 21 of the second embodiment described above, it is possible to calculate an operation time required for execution of a CH authentication command in the IC chip 25 of the IC card 22 with the reader device 21 to judge whether the IC chip 25 is a genuine or counterfeit one on the basis of the operation time, and, therefore, it is possible to perform genuine/counterfeit judgment of the IC card 22 in a short time.

That is, in the second embodiment, the rates of transmission (communication speeds) at the time of transmitting a CH authentication command to the IC chip 25 are caused to be different from each other, and the required times T1 and T2 required after transmitting each of the plural CH authentication commands until receiving responses to the CH authentication commands are measured. Then, the operation time Tc required for execution of the authentication command in the IC chip 25 is calculated on the basis of the required times T1 and T2, and it is judged whether the IC chip 25 is a genuine or counterfeit one on the basis of this operation time Tc. According to the reader device 21 of the second embodiment, by using genuine/counterfeit judgment of the IC chip 25 according to the present invention in addition to genuine/counterfeit judgment means based on an image which includes a hologram mark or a magnetic stripe, it is possible to perform genuine/counterfeit judgment of an IC card 22 more certainly.

For example, the required time T1 required when the CH authentication command has been transmitted at the base speed (106 kbps) is measured first, and the required time T2 when the CH authentication command has been transmitted at the double speed (212 kbps) is measured next. In this case, "(T1−T2)×2" can be thought to be a communication time at the base speed, and an operation time Tc required for execution of the CH authentication command in the IC chip 25 can be thought to be "T1−(T1−T2)×2". If this operation time Tc is beyond a range of a value to be calculated in the case of a genuine IC chip 25, the IC chip 25 is judged to be a counterfeit one.

In the second embodiment, the rates of transmission (communication speeds) at the time of transmitting an illegal CH authentication command to the IC chip 25 are caused to be different from each other, and required times T1 and T2 required after transmitting each of the plural illegal CH authentication commands until receiving response to the illegal CH authentication command are measured. Then, the operation time Tf required for execution of the illegal CH authentication command in the IC chip 25 is calculated on the basis of the required times T1 and T2, and it is judged whether the IC chip 25 is a genuine or counterfeit one on the basis of this operation time Tf and the above operation time Tc.

In general, in a genuine IC chip 25, there is not a major difference between an operation time for processing an illegal CH authentication command has been transmitted and an operation time for processing a legal CH authentication command has been transmitted. On the other hand, in a counterfeit IC chip 5, there is a major difference between an operation time for processing an illegal CH authentication command has been transmitted and an operation time for processing a legal CH authentication command has been transmitted because of a reason that the IC chip 5 is not a special-purpose product (exclusive goods), or the like. Therefore, if there is a major difference between operation times, the IC chip 5 can be judged to be a counterfeit one.

The reason is as follows.

One of methods of attacking the IC chip 25 for a malicious third person to guess and steal important information such as key data implemented in the IC chip 25, is using variation of an operation time due to difference among key values Therefore, the provider (supplier) of the IC chip 25 improves a CH authentication command collation algorithm so that operation time difference among different key values or different password input values is reduced when releasing a new-generation IC chip. The latest-generation IC chip is securely managed by its provider (supplier) or a card company. If counterfeit occurs, the counterfeit IC card is made with the use of an old IC chip. Therefore, if a great difference occurs between operation times, the IC chip 25 is judged to be counterfeited with the use of an old-generation one.

On the contrary, the provider (supplier) of the IC chip 25 may change the design of a new-generation IC chip so as to reduce power consumption of the IC chip 25. As a result, an operation time in the case where a CH authentication command has been transmitted to the new-generation IC chip may be longer than that of an old-generation IC chip. In that case also, operation time variation between the case where a legal CH authentication command has been transmitted to the new-generation IC chip and the case where an illegal CH authentication command has been transmitted to the new-generation IC chip is different from operation time variation of the old-generation IC chip. Therefore, even in such a case, it is possible to judge whether the IC card is a genuine IC card having a proper-generation IC chip or an IC card counterfeited with the use of an old-generation IC chip. Such data about the operation time variation for each generation may be stored in the storage section 27 of the reader device 21. The data about the operation time variation for each generation may be updated by connection to the settlement center 29, similarly to operation time data for each generation.

The embodiment of discriminating between a genuine IC card provided with a proper-generation IC chip, which is held by an legal holder, and an IC card counterfeited with the use of an old-generation IC chip, which is held by a malicious third person will be described in more detail.

Figure 8:
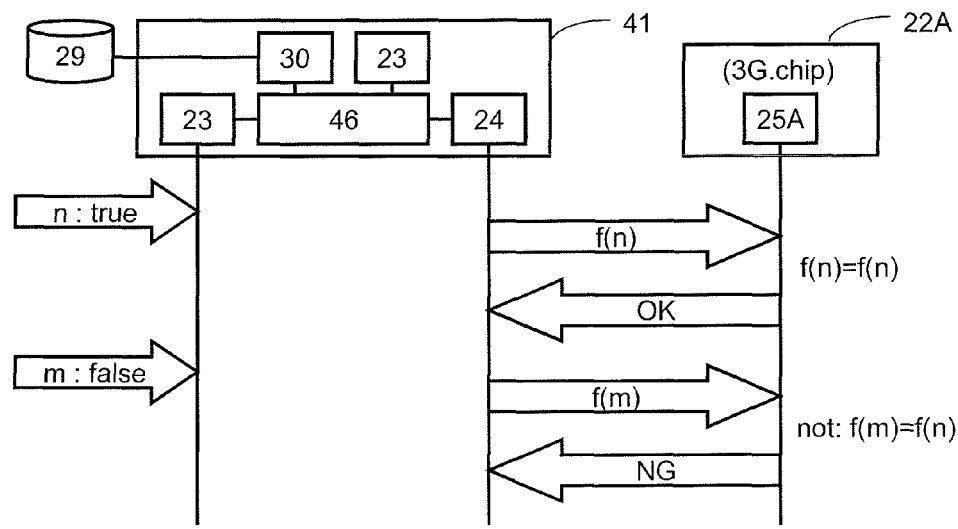
FIG. 8(*a*) is a diagram about a case where a conventional reader device reads a genuine IC card provided with a proper-generation IC chip, which is held by a legal holder, and FIG. 8(*b*) is a diagram about a case where a reader device 21 of the second embodiment reads a genuine IC card provided with a proper-generation IC chip, which is held by a legal holder.
Figure 8:
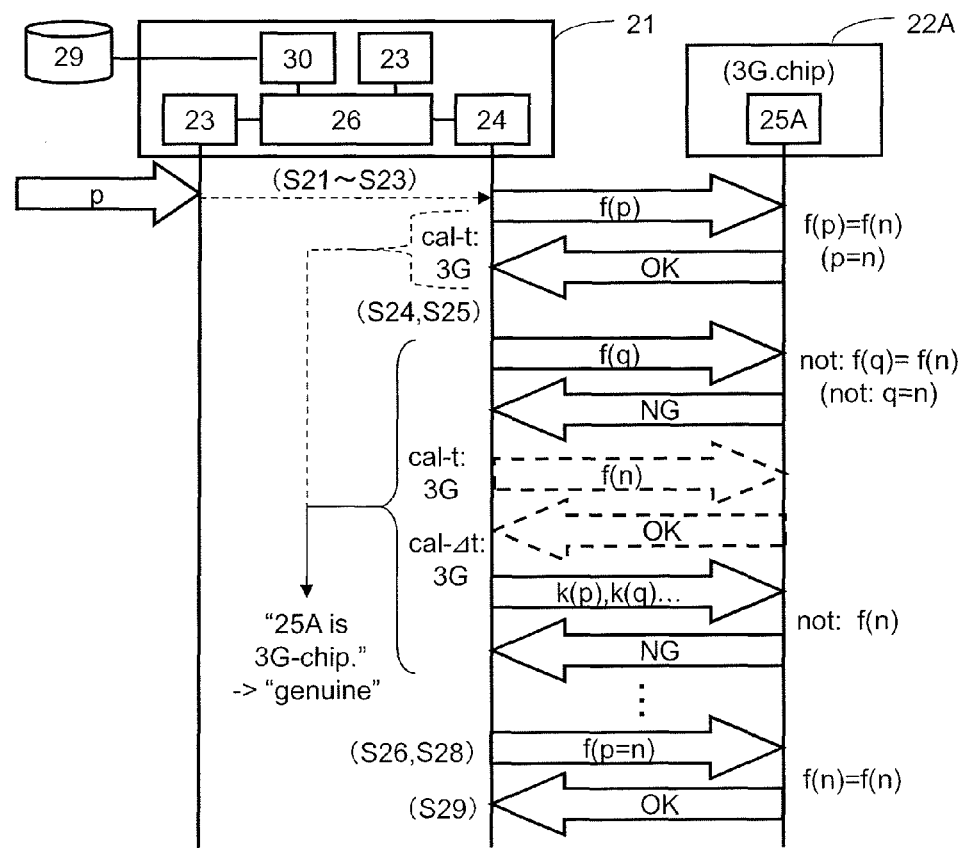

FIG. 8 is a diagram about a case where the reader device reads a genuine IC card provided with a proper-generation IC chip 25A, which is held by a legal holder. FIG. 8(*a*) is a diagram illustrating a case where a conventional reader device 41 reads the IC card 22A, and FIG. 8(*b*) is a diagram illustrating a case where the reader device 21 of the second embodiment reads the IC card 22A. In FIG. 8, it is assumed that the legal holder holds the genuine IC card 22A which is card-holder-authenticated with a correct password n. It is assumed that the IC chip 25A used for this genuine IC card 22A is, for example, the third-generation IC chip 25A in FIG. 5. The password n and a card number are stored in the IC chip 25A. The reader device 21 judges that the third-generation IC chip should be mounted on the IC card 22A from the card number stored in the IC chip 25A by referring to a reference table stored in the storage section 27, which is not shown.

In FIG. 8(*a*), the conventional reader device 41 transmits a legal CH authentication command which includes legal encrypted data f(n) obtained by performing certain mathematical processing for the password n, to the genuine IC card 22A first. In the proper-generation IC chip 25A provided for the IC card 22A, the same function f as is stored in the conventional reader device 41 is stored in advance. Then, the proper-generation IC chip 25A provided for the IC card 22A collates the encrypted data f(n) which is included in the transmitted legal CH authentication command with data f(n) obtained from the password n stored inside the chip with the use of the function f. In this case, f(n)=f(n) is obtained as a matter of course, and, therefore, the genuine IC card 22A performs transmission to the effect that a result of the collation of the password of this genuine IC card 22A indicates that the password is correct. As described above, the conventional reader device 41 judges that the genuine IC card 22A provided with the legal IC chip 25A is held by a legal holder, from the correct password n. Then, it becomes possible to perform subsequent credit settlement or payment with electronic money by the conventional reader device 41.

If a password inputted to the PIN pad 23 is not the correct password n but a wrong password m, the conventional reader device 41 transmits a legal CH authentication command which includes legal encrypted data f(m) obtained by performing certain mathematical processing for the password m, to the genuine IC card 22A. Then, the proper-generation IC chip 25A provided for the IC card 22A collates the encrypted data f(m) which is included in the transmitted legal CH authentication command with data f(m) obtained from the password n stored inside the chip with the use of the function f. In this case, f(m)≠f(n) is obtained as a matter of course (that is, f(m)=f(n) is not obtained), and, therefore, the genuine IC card 22A performs transmission of the effect that a result of the collation of the password of this genuine IC card 22A indicates that the password is not correct, to the conventional reader device 41.

In comparison, the reader device 21 of the second embodiment in FIG. 8(*b*) can also transmit an illegal CH authentication command to be described below to the genuine IC card 22A, in addition to transmitting a legal CH authentication command (corresponding to steps S21 to S23 in FIG. 9 to be described later) in a procedure similar to that shown in FIG. 8(*a*). The reader device 21 may generate illegal encrypted data to be included in this illegal CH authentication command by replacing the correct password n with another password q or by replacing the predetermined function f with another function k. Furthermore, the reader device 21 may generate the illegal encrypted data to be included in this illegal CH authentication command by replacing both of them (corresponding to step S25 in FIG. 9 to be described later).

Figure 9:
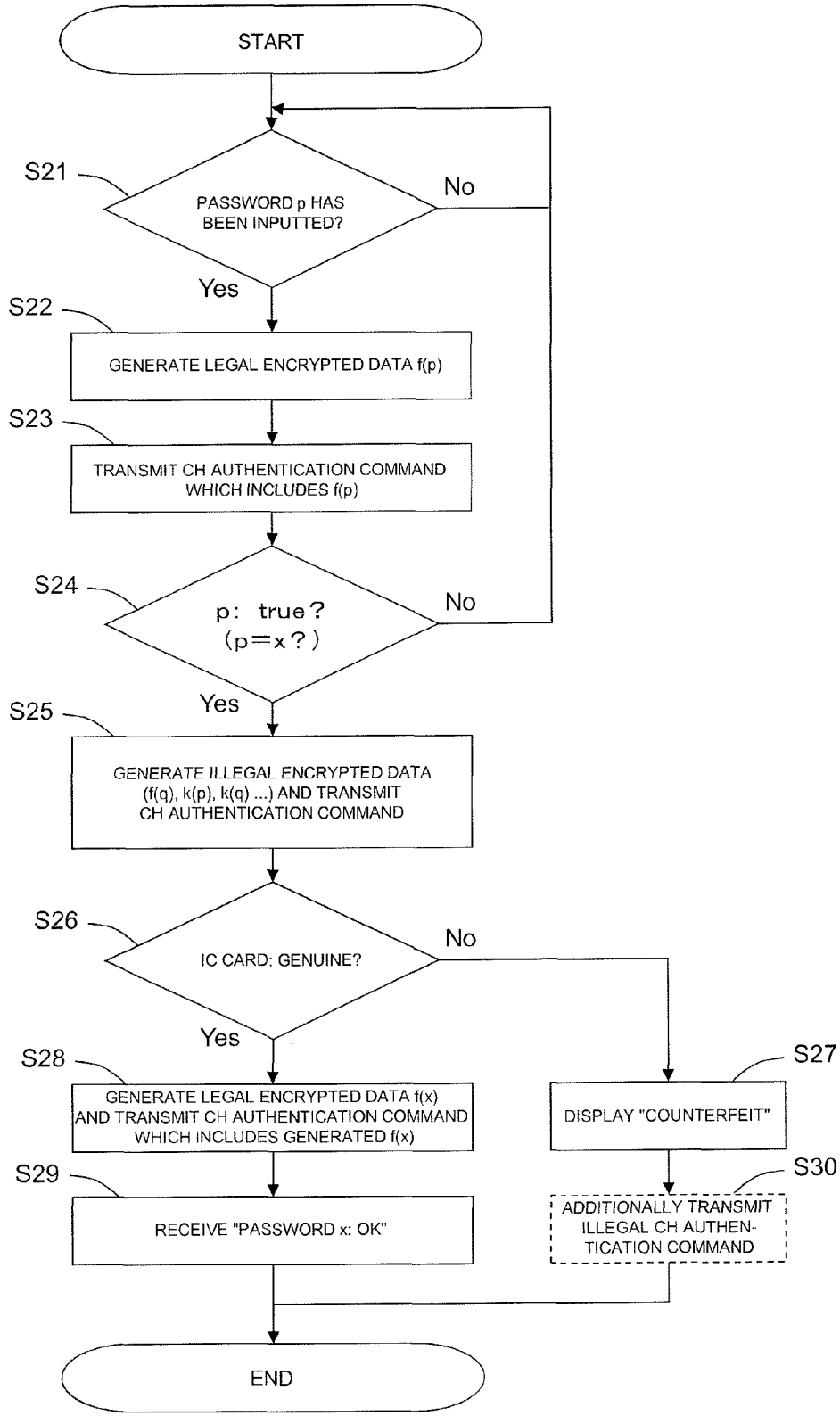
FIG. 9 is a flowchart of a process after a password is inputted to a PIN pad of the reader device until card holder authentication and a genuine/counterfeit judgment of an IC card are performed.

Then, the reader device 21 may transmit the illegal CH authentication command to the IC card 22A, for example, at a timing described below. FIG. 9 is a flowchart of a process after a password is inputted to the PIN pad 23 of the reader device 21 until card holder authentication and genuine/counterfeit judgment of an IC card are performed.

When a password p (p=n is obtained if the password p is a correct password) is inputted from the PIN pad 23 (step S21), the reader device 21 generates encrypted data f(p) using the password p (step S22). Then, the reader device 21 transmits a CH authentication command which includes the encrypted data f(p) (step S23). That is, the reader device 21 transmits a CH authentication command which includes encrypted data which has been generated with the use of the password p inputted from the PIN pad 23 before transmitting an illegal CH authentication command. Then, the reader device 21 confirms whether the password p inputted to the PIN pad 23 is a correct password n or not, that is, whether p=n is obtained or not from a response of the IC card 25A (step S24). If p≠n is obtained, the reader device 21 prompts a person who inputted the password to input a correct password and waits for a password p to be inputted again. If p=n is obtained, the encrypted data f(p) which has been generated with the use of the password p is legal encrypted data f(n).

At this step, if it can be confirmed that the password p inputted with the use of the PIN pad 23 is the correct password n, the reader device 21 may perform transmission using the legal CH authentication command which includes the legal encrypted data f(n) again at a different rate of transmission. Then, the reader device 21 may derive the operation time ("cal-t" in FIG. 8(*b*)) of the IC chip 25A mounted on the IC card 22A by the calculation method described before (see FIG. 6) on the basis of two response signals from the IC card 22A to the two transmissions at the different rates of transmission. Thereby, the reader device 21 can perform a part of genuine/counterfeit judgment of the IC card 22A at this point of time. The generation of the IC chip 25A which should be mounted on the IC card 22A targeted by the genuine/counterfeit judgment can be known to be, for example, the third generation from a card number stored in the IC chip 25A. Therefore, the reader device 21 can check whether the operation time ("cal-t" in FIG. 8(*b*)) derived by transmitting of the two legal CH authentication commands at the different rates of transmission is included, for example, within a "range Z where judgment of being a genuine one is made for the third generation" in FIG. 5. Since the IC chip 25A of the IC card 22A shown in FIG. 8 is of the third generation, an operation time derived by the calculation is to be within this range Z (that is, "cal-t: 3G" is obtained in FIG. 8(*b*)).

If the IC card proves to be a counterfeit one at this stage, the reader device 21 may put an end to the genuine/counterfeit judgment process at this point of time and disable the IC card immediately. However, the reader device 21 in the second embodiment further performs a procedure to be described later to make sure that the genuine/counterfeit judgment is completely performed. By the procedure to be described later, the reader device 21 can derive the operation time of the IC card 22A using an illegal CH authentication command. Then, the reader device 21 can determine a difference between this operation time derived with the use of the illegal CH authentication command ("cal-t" in FIG. 8(b)) and the operation time derived with the use of the legal CH authentication command before, that is, a "variation between the operation times" ("cal-Δt" in FIG. 8(b)). Due to each operation time and the "variation between the operation times", the reader device 21 can perform genuine/counterfeit judgment of the IC card 22A more certainly.

That is, the reader device 21 transmits an illegal CH authentication command which includes illegal encrypted data generated in the method described before, for example, any of f(q), k(n) and k(q) next (step S25). Each illegal CH authentication command is also transmitted twice at different rates of transmission. It is desirable that multiple sets of illegal CH authentication commands are transmitted because of the reason to be described later. Then, the reader device 21 can derive the operation time ("cal-t" in FIG. 8(b)) of the IC chip 25A mounted on the IC card 22A by the calculation method described before (see FIG. 6) using response signals to the transmissions of the illegal CH authentication commands. The reader device 21 may, not only decide genuine/counterfeit judgment of the IC card 22A at this step, but also further determines a "difference between operation times" ("cal-tΔ" in FIG. 8(b)) to completely perform the genuine/counterfeit judgment. The "difference between operation times" means each of differences among the operation times obtained by transmitting these illegal CH authentication commands ("cal-t" in FIG. 8(b)) and the operation time derived with the use of the legal CH authentication command before.

As described before, in a genuine IC chip 25A, there is not a major difference (a difference, that is, "cal-Δt" in FIG. 8(b)) between an operation time for processing an illegal CH authentication command has been transmitted and an operation time for processing a legal CH authentication command has been transmitted. On the other hand, in an illegal IC chip, there is a major difference between an operation time for processing an illegal CH authentication command has been transmitted and an operation time for processing a legal CH authentication command has been transmitted. Therefore, if there is a major difference between operation times due to the difference between CH authentication commands, the IC card mounted with the IC chip can be judged to be a counterfeit one. In the reader device 21 of the second embodiment, data according to generations about the "difference between operation times" is stored in the storage section 27 in addition to the data about the "operation time" of the IC chip according to generations as shown in FIG. 5. The reader device 21 identifies the generation of the IC chip that is supposed to be mounted by the data according to generations, and, if the "difference between operation times" is included within a permissible range of the IC chip of the generation (that is, "cal-Δt: 3G" in FIG. 8(b)), the IC card mounted with the IC chip is judged to be a genuine one ("genuine" in FIG. 8(b)). If the "difference between operation times" is beyond the permissible range (that is, in the case of "cal-Δt: not 3G"), it is judged that there is a possibility that the IC card was counterfeited ("counterfeit").

As described above, the reader device 21 performs genuine/counterfeit judgment on the basis of the "operation time" ("cal-t" in FIG. 8(b)) of the IC chip 25A obtained by transmission of the CH authentication command and the "difference between operation times" ("cal-Δt" in FIG. 8(b)), which have been described above (step S26). If it cannot be confirmed that the IC card 22A is a genuine IC card, the reader device 21 makes a notification to the effect that there is a suspicion that a counterfeit IC card is used (step S27) and ends the process flow. If the reader device 21 has multiple display sections, the display may be displayed only for the operator of the reader device without being displayed to the holder of the IC card. The reader device 21 may notify the settlement center 29 to that effect. Thereby, other reader devices which perform communication with the settlement center 29 after the notification also do not perform subsequent account settlement by credit or payment by electronic money by the counterfeit IC card, and it is possible to prevent the malicious third person from illegally using the IC card.

If the reader device 21 can confirm that the IC card 22A is a genuine IC card, it transmits legal card holder authentication which includes the legal encrypted data f(n) generated from the legal password again at the end. Then, the reader device 21 receives a response signal which confirms that access has been performed with the correct password n, from the IC card 22A and ends the process flow. (In order to clarify a relationship with FIG. 8(b) explained before, each step in FIG. 9 described before is also described in FIG. 8(b)).

As described above, the reason why the reader device 21 is set so as to, when judging the IC card 22A to be a genuine one, necessarily transmit the CH authentication command which includes the legal encrypted data f(p) both before and after performing genuine/counterfeit judgment of the IC chip 25A is as follows.

Usually, an upper limit of the number of times of password collation is specified for the IC card 22A. If the reader device 21 is set so as to transmit a CH authentication command which includes legal encrypted data f(p) only after performing genuine/counterfeit judgment of the IC chip 25A, a trouble as shown below occurs. In the case of an illegal CH authentication command used in genuine/counterfeit judgment of an IC chip, a collation result is certainly not correct. Therefore, the genuine/counterfeit judgment of the IC chip 25A itself leads to reduction in the number of times that password collation can be performed. Then, at the point of time when the genuine/counterfeit judgment of the IC chip 25A has ended, the IC card 22A is in a state that the number of times of password collation comes near to the upper limit, and the remaining number of times that collation can be performed is not sufficient. Therefore, if a CH authentication command based on a wrong password m is transmitted from the reader device 21 to the IC card 22A in that state, there is a possibility that the number of times of collation of the IC card 22A exceeds the upper limit.

If the reader device 21 is set so as to transmit a CH authentication command which includes legal encrypted data f(p) only before performing genuine/counterfeit judgment of the IC chip 25A, a trouble as shown below occurs. That is, due to an illegal CH authentication command used in genuine/counterfeit judgment of the IC chip 25A performed after that, the IC card 22A ends communication with the reader device 21 while the state continues that the number of times of password collation comes near to the upper limit, and the remaining number of times that collation can be performed is not sufficient. If a password inputted to the PIN pad 23 is wrong at the time of causing the IC card 22A to communicate with the reader device 21 after having passed for several days or hours (after the lapse of days or hours), there is also a possibility that the number of times of collating the password of the IC card 22A exceeds the upper limit at that point of time. Therefore, the reader device 21 is set so as to, when judging that the IC card 22A to be a genuine one, be sure to transmit the CH authentication command which includes the legal password data f(n) not only before performing genuine/counterfeit judgment of the IC chip 25A but also after performing the genuine/counterfeit judgment. Thereby, by transmitting the CH authentication command which includes the legal password data f(n) after performing the genuine/counterfeit judgment of the IC card 22A also, the number of times that password collation can be performed can be reset to a maximum value. Then, the holder of the IC card 22A can use the IC card 22A similarly as before without an uncomfortable feeling.

It was stated that it is desirable to use multiple sets of illegal CH authentication commands in genuine/counterfeit judgment of an IC card 22A. As for this, however, there is a point to be noted. When calculating an operation time at the time of genuine/counterfeit judgment of an IC card 22A, the reader device 21 transmits two CH authentication commands at different rates of transmission each other as described before. Therefore, when multiple sets of illegal CH authentication commands are successively used, twice the number of illegal CH authentication commands are successively transmitted actually. Then, there is a possibility that the IC card 22A is disabled before completion of the genuine/counterfeit judgment. Therefore, it is preferable to, when transmitting multiple sets of illegal CH authentication commands at the time of genuine/counterfeit judgment, transmit a legal CH authentication command between two different sets of illegal CH authentication commands. In this case, it is not necessary to transmit the legal CH authentication command twice at different rates of transmission. It is sufficient to transmit the legal CH authentication command once at any communicate rate. Otherwise, transmission of a legal CH authentication command generated from the same password as the password confirmed to be correct first (steps S21 to S23) at different rates of transmission may be performed between the two different sets of illegal CH authentication commands. In that case, immediately after the password is confirmed first (steps S21 to S23), the transmission of the legal CH authentication command generated from the same password at different rates of transmission may not be performed. Thereby, the reader device 21 can effectively perform genuine/counterfeit judgment of the IC card 22A without unnecessarily increasing the number of times of transmitting the CH authentication command. Anyway, the number of times that password collation of the IC card 22A can be performed is reset to a maximum value by the transmission of the legal CH authentication command. Then, the number of times of collating the password of the IC card 22A never exceeds an upper limit, and it is possible to prevent the genuine IC card 22A held by a legal holder from being disabled.

Also for genuine/counterfeit judgment of an illegal IC card 22B to be described later with the use of FIG. 10, it is desirable that multiple sets of illegal CH authentication commands are used and a legal CH authentication command is transmitted between two illegal CH authentication commands at each of multiple sets of the illegal CH authentication commands. It is not known whether an IC card targeted by genuine/counterfeit judgment is a genuine or counterfeit one until the genuine/counterfeit judgment is completed. Therefore, even if the IC card is an illegal IC card 22B, it must be treated similarly to a genuine IC card until the genuine/counterfeit judgment is completed.

The IC chip 25A mounted on the IC card 22A is known to be of a proper generation from the above procedure. Then, the IC card 22A mounted with the IC chip 25A is proved to be a genuine IC card. As described above, the reader device 21 of the second embodiment judges that the genuine IC card 22A provided with the legal IC chip 25A is held by a legal holder, from the correct password n. Then, it becomes possible to perform subsequent credit settlement or payment with electronic money by the reader device 21.

Figure 10:
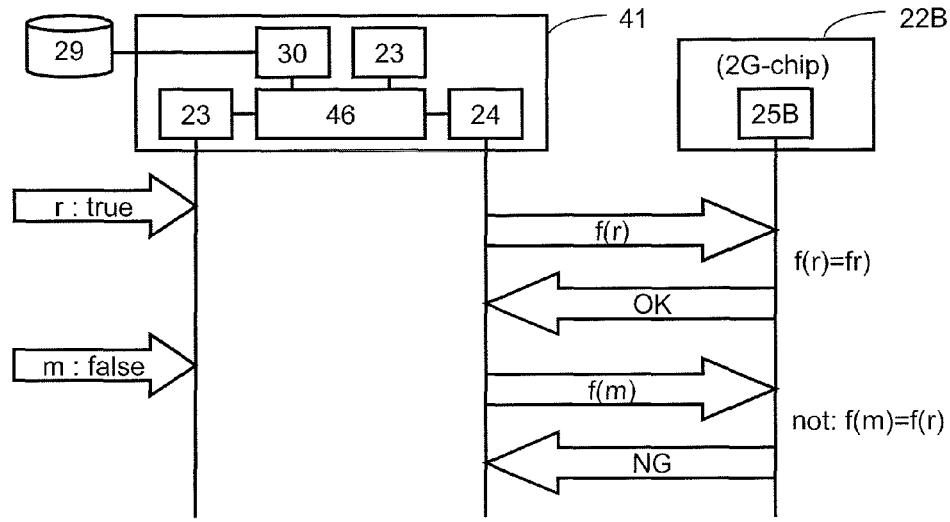
FIG. 10(*a*) is a diagram about a case where a conventional reader device reads an IC card counterfeited by a malicious third person with the use of an old-generation IC chip, and FIG. 10(*b*) is a diagram of a case where the reader device of the second embodiment reads an IC card counterfeited by a malicious third person with the use of an old-generation IC chip.
Figure 10:
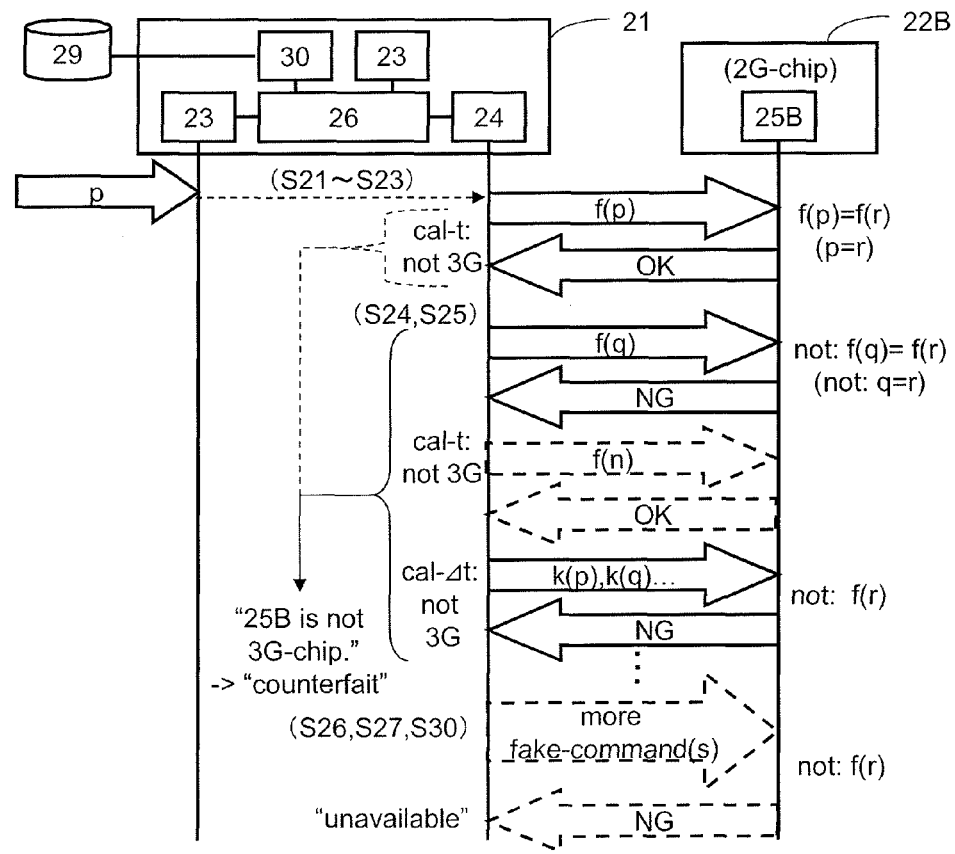

FIG. 10 is a diagram about a case where a reader device reads an IC card 22B counterfeited by a malicious third person with the use of an old-generation IC chip 25B. FIG. 10(a) is a diagram illustrating a case where the conventional reader device 41 reads the IC card 22B, and FIG. 10(b) is a diagram illustrating a case where the reader device 21 of the second embodiment reads the IC card 22B. In FIG. 10, it is assumed that the malicious third person holds the counterfeit IC card 22B which is card-holder-authenticated with a password r. Usually, since the malicious third person cannot know the password n of an IC card 22A held by a legal holder, he or she sets an arbitrary password r for the counterfeit IC card 22B. A third-generation IC chip, which is the latest IC chip in this case, is securely managed by a card company or the like, and it is difficult to steal the third-generation IC chip. Therefore, it is assumed that the IC chip 25B used for this counterfeit IC card 22B is, for example, the second-generation IC chip in FIG. 5. The malicious third person stores a card number in the IC chip 25B in addition to the password r. The card number is the same as that of the genuine IC card 22A in FIG. 8. Therefore, the reader device 21 in FIG. 10 judges that a third-generation IC chip should be mounted on the IC card 22B from the card number stored in the IC chip 25B by referring to the reference table stored in the storage section 27 which is not shown.

In FIG. 10(a), the conventional reader device 41 transmits a legal CH authentication command which includes legal encrypted data f(r) obtained by performing certain mathematical processing for the password r, to the counterfeit IC card 22B first. In the old-generation IC chip 25B provided for the IC card 22B, the same function f as is stored in the conventional reader device 41 is stored in advance. Then, the old-generation IC chip 25B provided for the IC card 22B collates the encrypted data f(r) which is included in the transmitted legal CH authentication command with data f(r) obtained from the password n stored inside the chip with the use of the function f. In this case, f(r)=f(r) is obtained as a matter of course, and, therefore, the old IC chip 25B performs transmission to the effect that a result of the collation of the password of this counterfeit IC card 22B indicates that the password is correct, to the conventional reader device 41. As a result, the conventional reader device 41 cannot find out that the counterfeit IC card 22B provided with the illegal IC chip 25B is a counterfeit IC card held by a malicious third person and wrongly judges that the IC card 22B is held by a legal holder. Then, it becomes possible to perform subsequent credit settlement or illegal payment with electronic money by the conventional reader device 41.

Since a case where a password inputted to the PIN pad 23 is not the password r but a wrong password is similar to the case described with the use of FIG. 8(a), details thereof is omitted.

In comparison, the reader device 21 of the second embodiment in FIG. 10(b) can also transmit an illegal CH authentication command to be described below to the counterfeit IC card 22B, in addition to transmitting a legal CH authentication command (corresponding to steps S21 to S23 in FIG. 9) in a procedure similar to that shown in FIG. 10(a). The reader device 21 may generate illegal encrypted data to be included in this illegal CH authentication command by replacing the correct password n with another password q or by replacing the predetermined function f with another function k. Furthermore, the reader device 21 may generate the illegal encrypted data to be included in this illegal CH authentication command by replacing both of them (corresponding to step S25 in FIG. 9).

Similar to the foregoing description for FIGS. 8 and 9, when the reader device 21 judges the IC card 22B to be a genuine one, the reader device 21 is set so as to necessarily transmit the CH authentication command which includes the legal encrypted data f(p=r) both before and after performing genuine/counterfeit judgment of the IC chip 25B.

In comparison, the reader device 21 in FIG. 10(*b*) uses a procedure described below. That is, when a password p (p=r is obtained if the password p is a correct password) is inputted from the PIN pad 23 (step S21), the reader device 21 generates encrypted data f(p) using the password p first (step S22). Then, the reader device 21 transmits a CH authentication command which includes the encrypted data f(p) (step S23). That is, the reader device 21 transmits a CH authentication command which includes encrypted data which has been generated with the use of the password p inputted from the PIN pad 23 before transmitting an illegal CH authentication command. Then, the reader device 21 confirms whether the password p inputted to the PIN pad 23 is a correct password r or not, that is, whether p=r is obtained or not from a response of the IC card 25B (step S24). If p≠r is obtained, the reader device 21 prompts a person who inputted the password to input a correct password and waits for a password p to be inputted again. If p=r is obtained, the encrypted data f(p) which has been generated with the use of the password p is the legal encrypted data f(r).

At this time, if it can be confirmed that the password p inputted with the use of the PIN pad 23 is the correct password r, the reader device 21 may perform transmission using the legal CH authentication command which includes the legal encrypted data f(r) again at a different rate of transmission. Then, the reader device 21 may derive the operation time ("cal-t" in FIG. 10(*b*)) of the IC chip 25B mounted on the IC card 22B by the calculation method described before (see FIG. 6) on the basis of two response signal from the IC card 22B to the two transmissions at different rates of transmission. Thereby, the reader device 21 can perform a part of genuine/counterfeit judgment of the IC card 22B at this step. The generation of the IC chip 25B which should be mounted on the IC card 22B targeted by the genuine/counterfeit judgment can be known to be, for example, the third generation from a card number stored in the IC chip 25B. Therefore, the reader device 21 can check whether the operation time ("cal-t" in FIG. 10(*b*)) derived by transmitting of the two legal CH authentication commands at the different rates of transmission is included, for example, within a "range Z where judgment of being a genuine one is made for the third generation" in FIG. 5. However, since the IC chip 25B of the IC card 22B shown in FIG. 10 is of the second generation, an operation time derived by the calculation is not to be within this range Z (that is, "cal-t: not 3G" is obtained in FIG. 10(*b*)).

If the IC card 22B proves to be a counterfeit one at this step, the reader device 21 may put an end to the genuine/counterfeit judgment process and disable the IC card 22B immediately. However, the reader device 21 in the second embodiment further performs a procedure to be described later to make sure that the genuine/counterfeit judgment is completely performed. By the procedure to be described later, the reader device 21 can derive the operation time of the IC card 22B using an illegal CH authentication command. Then, the reader device 21 can determine a difference between the operation time ("cal-t) in FIG. 10(*b*)) and the operation time derived with the use of the legal CH authentication command before, that is, a "difference between the operation times" ("cal-Δt" in FIG. 10(*b*)). Due to each operation time and the "difference between the operation times", the reader device 21 can perform genuine/counterfeit judgment of the IC card 22B more certainly.

That is, the reader device 21 transmits an illegal CH authentication command which includes illegal encrypted data generated in the method described before, for example, any of f(q), k(n) and k(q) next (step S25). Each illegal CH authentication command is also transmitted twice at different rates of transmission. It is desirable that multiple sets of illegal CH authentication commands are transmitted because of the reason described before. Then, the reader device 21 can derive the operation time ("cal-t" in FIG. 10(*b*)) of the IC chip 25B mounted on the IC card 22B by the calculation method described before (see FIG. 6) using response signals to transmissions of the illegal CH authentication commands. The reader device 21 may, not only decide genuine/counterfeit judgment of the IC card 22B at this step, but also further determines a "difference between operation times" ("cal-tΔ" in FIG. 10(*b*)) to completely perform the genuine/counterfeit judgment. The "difference between operation times" means each of differences among the operation times obtained by transmitting these illegal CH authentication commands ("cal-t" in FIG. 10(*b*)) and the operation time derived with the use of the legal CH authentication command before.

As described before, in an illegal IC chip 25B, there is a major difference (a difference, that is, "cal-Δt" in FIG. 10(*b*)) between an operation time for processing an illegal CH authentication command has been transmitted and an operation time for processing a legal CH authentication command has been transmitted. The IC card 22B mounted with the IC chip 25B can be judged to be a counterfeit one. In the reader device 21 of the second embodiment, data according to generations about the "difference between operation times" is stored in the storage section 27 in addition to the data about the "operation time" of the IC chip according to generations as shown in FIG. 5. Only by genuine/counterfeit judgment by "operation times", the reader device 21 may wrongly judge that the generation of the IC chip 25B that is supposed to be mounted on the IC card 22B is the third generation. However, if the "difference between operation times" is not included within the permissible range of the generation of the IC chip (that is, in the case of "cal-Δt: not 3G" in FIG. 10(*b*)), the reader device 21 can correctly judge that there is a possibility that the IC card was counterfeited ("counterfeit" in FIG. 10(*b*)). As described above, the reader device 21 can perform genuine/counterfeit judgment of the IC card 22B more certainly.

As described above, the reader device 21 performs genuine/counterfeit judgment on the basis of the "operation time" ("cal-t" in FIG. 10(*b*)) of the IC chip 25B obtained by transmission of CH authentication commands and the "difference between operation times" ("cal-Δt" in FIG. 10(*b*)) (step S26), and can judge that the IC card 22B is a counterfeit one. That is, the reader device 21 finds out that the IC chip 25B mounted on the IC card 22B is not of the proper third-generation and judges that there is a strong possibility that the IC card 22B mounted with the IC chip 25B is a counterfeit IC card. The reader device 21 of the second embodiment does not judge whether the IC card 22B which is provided with an illegal IC chip 25B is counterfeit or not only by the password r set arbitrarily by a malicious third person. That is, by performing genuine/counterfeit judgment using CH authentication commands at different rates of transmission, the reader device 21 can find out that this IC card 22B is a counterfeit one (corresponding to "NO" at step S26 in FIG. 9). Then, subsequent settlement by credit or payment by electronic money is not performed by the reader device 21, and illegal use of the IC card 22B by the malicious third person is prevented.

In addition, the reader device 21 can take means for preventing the counterfeit IC card 22B from further being used. As described before, the reader device 21 is set so as to, if the IC card 22B is a genuine one, necessarily transmit a CH authentication command which includes legal encrypted data f(p=r) both before and after genuine/counterfeit judgment of the IC chip 25B. However, if judging there is a suspicion that that the IC card 22B is counterfeited, the reader device 21 does not have to perform transmission of the CH authentication command which includes the legal encrypted data f(p=r) after genuine/counterfeit judgment of the IC chip 25B. Then, after genuine/counterfeit judgment of the IC chip 25B, the reader device 21 may further transmit an illegal authentication command so that the number of times of collating the password of the IC card 22B exceeds an upper limit (step S30 in FIG. 9). That is, the reader device 21 sets the number of successive transmissions of the illegal CH authentication command in this case larger than that in the case of judging an IC card to be a genuine one ("more command(s) in FIG. 10(b)). If the reader device 21 ends the process after receiving a collation result of NG and a notification that the IC chip 25B has been made unavailable ("unavailable" in FIG. 10(b)) from the IC chip 25B of the IC card 22b, the process is performed more completely. As the illegal CH authentication command used then, the illegal CH authentication command already generated at the time of genuine/counterfeit judgment (step 25) may be used. Thereby, the reader device 21 can shorten the time required to generate a new illegal CH authentication command and can make the IC card 22B unavailable quickly and certainly. Anyway, the IC card 22B is made unavailable at that step and can never be used again. Even if a malicious third person attempts to use an IC card 22B again with a conventional reader device 41 after using the IC card 22B with a reader device 21 of the second embodiment and running away because it is nearly found that the IC card 22B is a counterfeit one, it is possible to prevent the malicious person from doing it. Then, it is possible to reduce spread of damage due to illegal use of the IC card.

There is a possibility that an operation time derived by calculation as a result of the genuine/counterfeit judgment by transmission of the illegal CH authentication command is included, for example, within the overlapped area of the "range Z where judgment of being a genuine one is made for the third generation" and the "range Y where judgment of being a genuine one is made for the second generation". Thus, since a derived operation time may be included within a overlapped area where plural generation-ranges overlap, multiple illegal CH authentication commands are prepared so that multiple sets are transmitted to the IC card 22B as described before (of course, the number of times of the transmission should be set within a range where the upper limit of the number of times of password collation held by the IC card 22B). Thereby, it can be expected that at least one of the operation times derived by calculation as a result of the genuine/counterfeit judgment by transmissions of the illegal CH authentication command is included within a area where plural generation-ranges do not overlap.

Furthermore, even if all operation times derived by calculation are included within a area where plural generation-ranges overlap, as a result of genuine/counterfeit judgment by transmission of multiple sets of illegal CH authentication commands, it is possible to judge that "there is a suspicion of a counterfeit IC card". If a correct password is used for a genuine IC chip, a derived operation time is not so far away from the center of the "range where judgment of being a genuine one is made" shown in FIG. 4 or 5. Of course, as described before, the method of determining a difference between an operation time in the case where a legal CH authentication command has been transmitted with the use of a correct password and an operation time in the case where an illegal CH authentication command has been transmitted, that is, a "difference between operation times" exists. It is possible to judge that "there is a suspicion of a counterfeit IC card" if the difference between operation times is equal to or above a threshold set in advance.

Furthermore, the IC cards 22, 22A and 22B used in the second embodiment may be IC cards having a contact electrode instead of the IC cards of the contactless communication type described above. The genuine/counterfeit judgment process described with the use of FIGS. 8 to 10 of the second embodiment can be applied to the first embodiment.

The second embodiment of the present invention has been described as an example. However, the scope of the present invention is not limited thereto but can be changed or modified according to purposes within the scope described in the claims. In the present embodiment, a passport or an IC card has been taken as an example of an information storage medium. However, other information storage medium, for example, a driver's license is also possible. Furthermore, though an operation time required for judging whether access to the information storage medium is to be authenticated or not and a card number as management information stored in the information storage medium are used as characteristic points the information storage medium has, the scope of the present invention is not limited thereto. For example, biometric authentication information may be used as management information and used as a characteristic point together with an operation time required for calculating whether the biometric information is genuine or counterfeit information. Furthermore, though the same authentication command is transmitted at different rates of transmission to extract the characteristic points in the present embodiment, the scope of the present invention is not limited thereto. For example, means such as changing a modulation method may be used.

The preferable embodiments of the present invention which are conceivable at present have been described. It is understood that various variations of the present embodiments are possible, and it is intended that all such variations within the true spirit and scope of the present invention are included in accompanying claims.

INDUSTRIAL APPLICABILITY

As described above, the reader device according to the present invention has an advantage of capable of performing genuine/counterfeit judgment of a form or a card in a short time, and the reader device is useful as a passport reader provided with a function of discriminating a counterfeit passport, an IC card reader/writer provided with a function of discriminating a counterfeit IC credit card and a data processing apparatus, such as a settlement terminal, mounted with the IC card reader/writer.

REFERENCE SIGNS LIST 1, 21 reader device
2 passport
3 photographing section
4 wireless communication IF section
5, 25, 25A, 25B IC chip
6, 26 control section
7, 27 storage section 8 computer apparatus
9 database section
10, 30 wired communication IF section
11 transmission control section
12, 32 required time measurement section
13, 33 operation time calculation section
14, 34 genuine/counterfeit judgment section
15, 35 data update section
22, 22A, 22B IC card
23 PIN pad
24 short distance communication IF section
29 settlement center
30 long distance communication IF section
31 communication control section

The invention claimed is:

1. A reader device reading information from an information storage medium, wherein
the information storage medium includes an IC chip executing a command transmitted from the reader device; and
the reader device comprises:
a command communicator transmitting a plurality of commands to the information storage medium and receiving a plurality of response signals from the information storage medium obtained as a result thereof;
a storage storing feature points of the IC chip;
a genuine/counterfeit judger extracting the feature points from at least one of the response signals from the information storage medium and judging whether the IC chip is a genuine or counterfeit one on the basis of the extracted feature points; and
a communication controller causing the command communicator to transmit a first command and, after receiving a first response signal from the information storage medium obtained as a result thereof, causing the command communicator to successively transmit a second command that is the same as the first command and that has a different communication specification.

2. The reader device according to claim 1, wherein
the feature points are management information about the information storage medium and generation discrimination information for discriminating the generation of the IC chip of the information storage medium;
the storage stores the generation discrimination information about the IC chip associated with the management information about the information storage medium; and
the genuine/counterfeit judger discriminates the generation of an IC chip that is supposed to be mounted on the information storage medium from the management information about the information storage medium and judges whether the generation discrimination information is about the IC chip of the generation that is supposed to be mounted.

3. The reader device according to claim 2, wherein
the generation discrimination information is an operation time required for the IC chip of the information storage medium to execute the command;
the communication specification is a rate of transmission;
the storage stores operation time information about the IC chip associated with the management information about the information storage medium, for each generation; and
the genuine/counterfeit judger discriminates the generation of the IC chip that is supposed to be mounted on the information storage medium from the management information about the information storage medium and judges whether the operation time is included in operation time information about the IC chip of the generation that is supposed to be mounted.

4. The reader device according to claim 2,
wherein the communication controller controls the command communicator to, if the generation discrimination information is judged to be generation information about the IC chip of the generation that is supposed to be mounted, as a result of the judgment by the genuine/counterfeit judger, transmit a legal authentication command generated so that such a response signal is obtained that an access to information stored in the information storage medium is authenticated by the information storage medium.

5. The reader device according to claim 2,
wherein the communication controller controls the command communicator to, if the generation discrimination information is judged not to be generation information about the IC chip of the generation that is supposed to be mounted, as a result of the judgment by the genuine/counterfeit judger, further transmit an illegal authentication command generated so that such a response signal is obtained that an access to information stored in the information storage medium is rejected by the information storage medium.

6. The reader device according to claim 1, further comprising:
a required time measurer measuring each of a first required time required after transmitting the first command to the information storage medium until receiving a first response signal of the information storage medium to the first command and a second required time required after transmitting the second command to the information storage medium until receiving a second response signal of the information storage medium to the second command; and
an operation time calculator calculating an operation time required for execution of the first command and the second command in the IC chip of the information storage medium, on the basis of the first required time and the second required time.

7. The reader device according to claim 1,
wherein both of the first command the second command are illegal authentication commands generated so that such a response signal is obtained that an access to information stored in the information storage medium is rejected by the information storage medium.

8. The reader device according to claim 7,
wherein the communication controller controls the command communicator to transmit a legal authentication command generated so that such a response signal is obtained that an access to information stored in the information storage medium is authenticated by the information storage medium, before transmitting the illegal authentication commands.

9. The reader device according to claim 1, further comprising:
a data updater updating data of the feature points stored in the storage.

10. A data processing apparatus comprising the reader device according to claim 1,
wherein the data processing apparatus executes subsequent data processing if the IC chip is judged to be legal by the genuine/counterfeit judger.

11. A genuine/counterfeit judgment method executed by a reader device reading information from an information storage medium, wherein the information storage medium includes an IC chip executing a first command or a second command transmitted from the reader device; and the genuine/counterfeit judgment method comprises:
- transmitting the first command to the information storage medium;
- transmitting the second command to the information storage medium after receiving a first response signal, from the information storage medium, obtained as a result of the first command;
- extracting feature points of the IC chip from the first response signal from the information storage medium and judging whether the IC chip is a genuine or counterfeit one on the basis of the extracted feature points.

* * * * *